(12) United States Patent
Mitani

(10) Patent No.: US 6,369,910 B1
(45) Date of Patent: Apr. 9, 2002

(54) PRINTING APPARATUS AND IMAGE PROCESSING METHOD

(75) Inventor: Keisuke Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/225,474

(22) Filed: Jan. 6, 1999

(30) Foreign Application Priority Data

Jan. 8, 1998 (JP) .......................................... 10-002629

(51) Int. Cl.[7] .............................................. G06K 15/00
(52) U.S. Cl. ..................................... 358/1.17; 358/1.13
(58) Field of Search ................................. 358/1.1, 1.13, 358/1.14, 1.15, 1.16, 1.17, 261.2, 426, 450, 261.3; 382/232, 173, 175, 239; 345/546; 710/5, 6, 30, 52, 56, 57

(56) References Cited

U.S. PATENT DOCUMENTS 6,124,943 A * 9/2000 Mitani ........................ 358/1.17
6,181,435 B1 * 1/2001 Onodeka ..................... 358/1.14

* cited by examiner

*Primary Examiner*—Arthur G. Evans
(74) *Attorney, Agent, or Firm*—Fitzpatrick, Cella, Harper & Scinto

(57) ABSTRACT

A printer according to this invention simultaneously performs image data generation and output in units of bands constituting one page. It is inconvenient to finish image data generation before output of the image data. Each band having a necessary rendering time longer than an output time of one band is picked up in advance. It is determined whether the memory capacity used is smaller in pre-rendering the picked bands or in simply increasing the number of band memories, thereby determining an optimal rendering schedule.

12 Claims, 24 Drawing Sheets

FIG.13

| INTERMEDIATE DATA TYPE A | RENDERING TIME A |

| INTERMEDIATE DATA TYPE B | RENDERING TIME B |

| INTERMEDIATE DATA TYPE C | RENDERING TIME C |

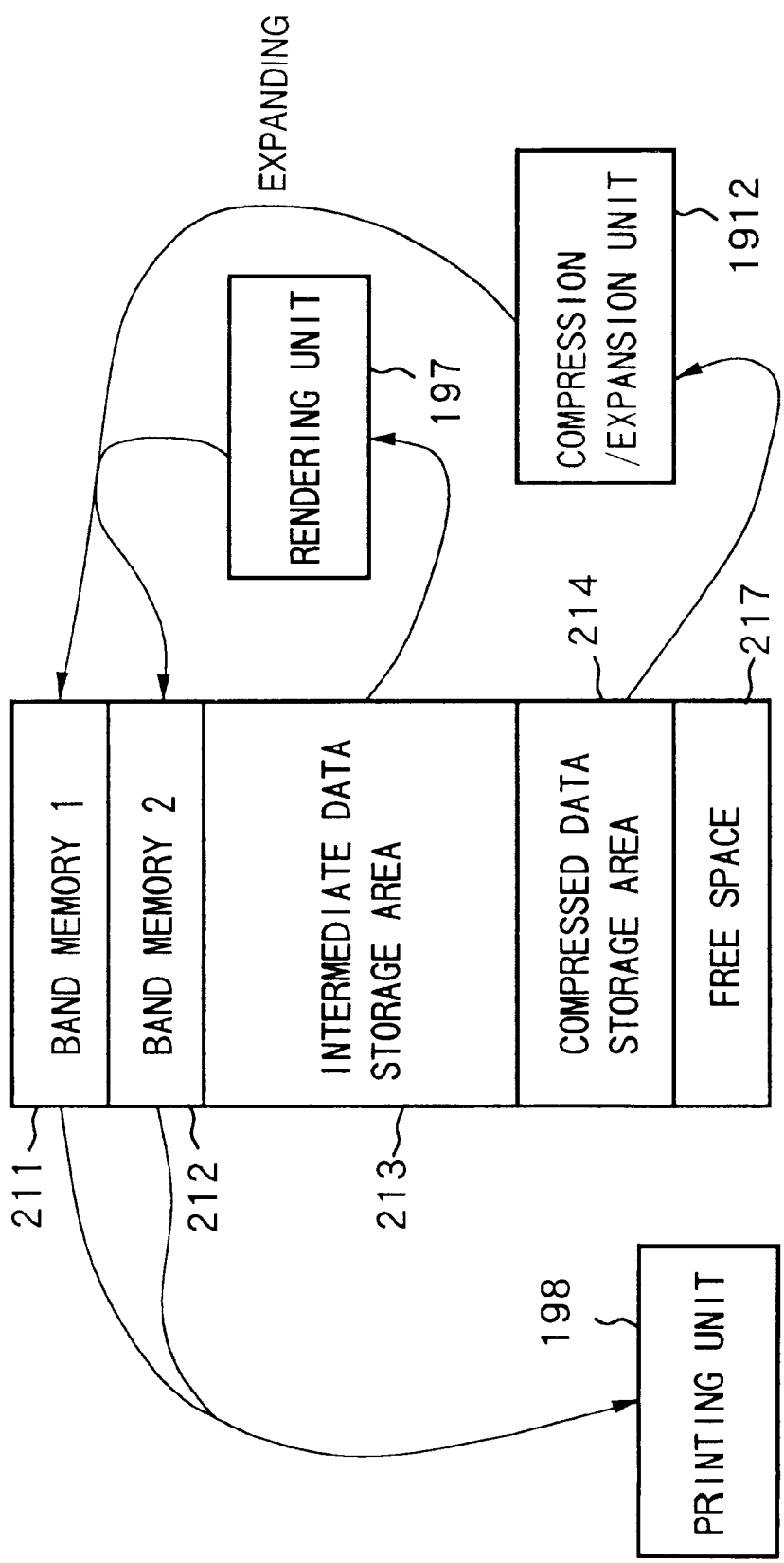

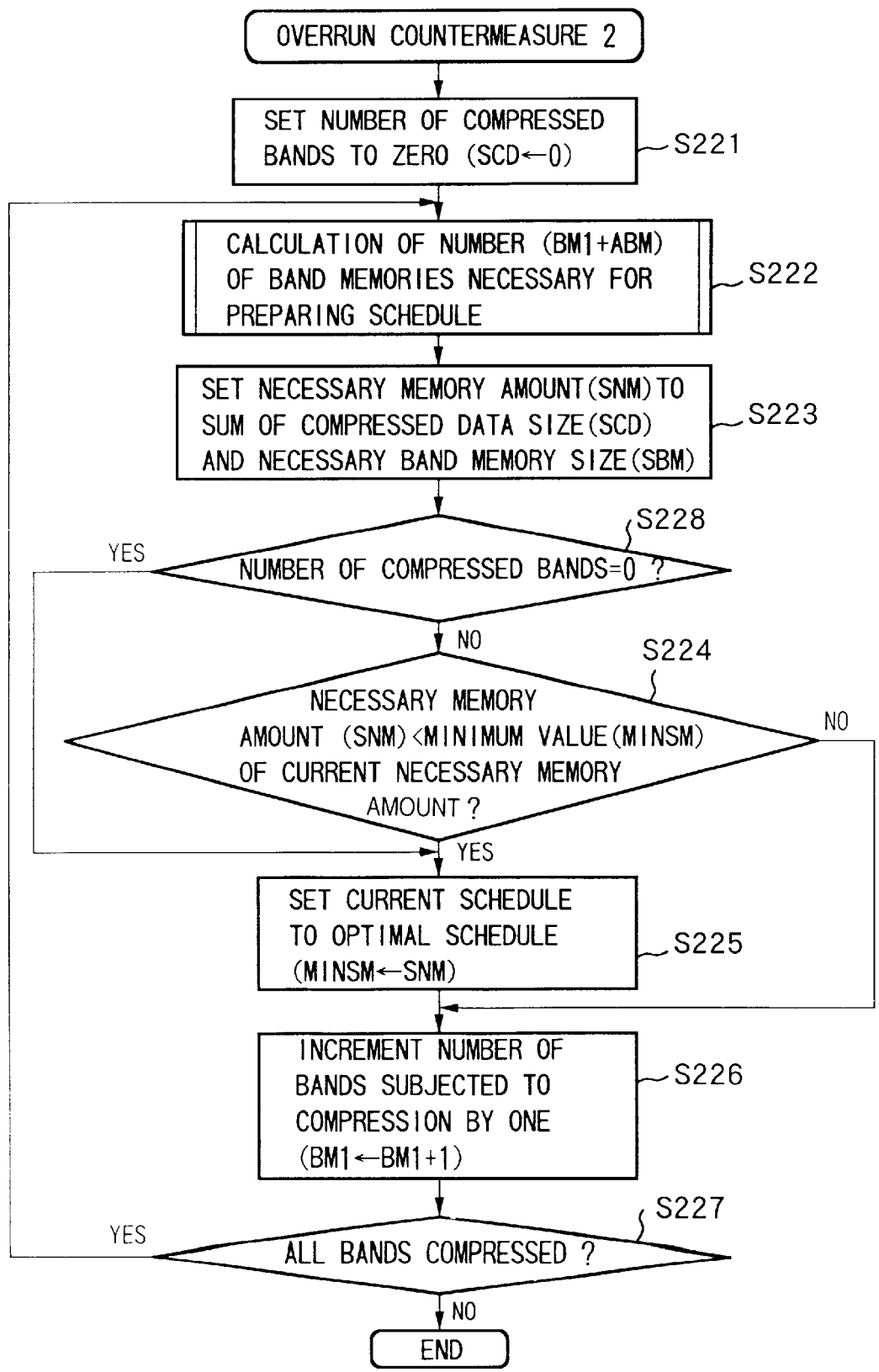

PRINTING APPARATUS AND IMAGE PROCESSING METHOD

BACKGROUND OF THE INVENTION

1. Field of the Invention

The present invention relates to a printing apparatus such as a laser printer for generating bitmap data from print data and printing the bitmap data, and an image processing method.

2. Description of the Related Art

There have been popularly used conventional printing apparatuses of a type which receives data (print data) associated with print contents and print formats from a host computer, generating bitmaps in a memory (this operation will be called rendering hereinafter) on the basis of the print data, and outputting (shipping) the bitmaps from the memory to an printing engine to print the bitmaps on, e.g., a paper surface.

When rendering and shipping are simultaneously performed in a printing apparatus of this type to process complicated print data and a large quantity of print data, the rendering time is much longer than the bitmap transfer time required in shipping. As a result, shipping cannot be properly performed (this phenomenon will be called a print overrun hereinafter).

To prevent this print overrun phenomenon, there is also available a printing apparatus of a type which renders a one-page output bitmap and then performs shipping. In this case, a memory for storing the one-page bitmap must be required, and the capacity of the memory must be increased in a printing apparatus having a high output resolution. As a result, efficiency of memory usage becomes poor, and the apparatus itself is very expensive.

An alternative conventional printing apparatus is also available in which one page is divided in small units (bands), shipping is performed upon completion of rendering one band, and the next band is rendered simultaneously with shipping. This operation is called banding process. In this case, when the rendering time of the next band simultaneously performed with shipping is longer than the shipping time of the preceding band, the print overrun phenomenon also occurs.

SUMMARY OF THE INVENTION

The present invention has been made to eliminate the conventional drawbacks described above, and has as its object to provide a printing apparatus and image processing method, which can minimize the capacity of a memory and prevent the print overrun.

In order to achieve the above object, according to the present invention, if an overrunning band is present while the number of band memories to be used is counted, the overrunning band is supposed to be pre-rendered, and a new band memory is assured to prepare rendering schedules. Of all the prepared schedules, a schedule having the minimum memory capacity is selected, and printing is performed.

Alternatively, if an overrunning band is present, it is supposed to be rendered, compressed, and stored in advance, and schedules are then prepared. In preparing the schedules, the expansion time of the compressed band is regarded as the rendering time. Of all the prepared schedules, a schedule having the minimum memory capacity is selected, and printing is performed.

Another object of the present invention is to provide a printing apparatus for rendering band image data to a band memory and outputting the band image data from the band memory simultaneously comprises:

time prediction means for obtaining a necessary rendering time of each band;

schedule means for preparing a rendering schedule having a minimum memory capacity on the basis of the necessary rendering time and a necessary printing time of the rendered band image data; and rendering means for rendering each band in accordance with the schedule; and output means for outputting contents of each band memory in accordance with the schedule.

The schedule means preferably prepares a plurality of different schedules, determines as the schedule having the minimum memory capacity a schedule having a minimum number of band memories of the plurality of different schedules, adds a new band memory for rendering, in advance, a given band whose rendering end time does not match output start time when rendering and output of image data of the given band are simultaneously performed using a predetermined number of band memories, and prepares the plurality of different schedules by changing the predetermined number of band memories.

Alternatively, the schedule means preferably prepares a plurality of different schedules, determines a schedule having a minimum memory capacity of the plurality of different schedules, adds a new memory for rendering, compressing, and storing, in advance, a given band whose rendering end time does not match output start time when rendering and output of image data of the given band are simultaneously performed using a predetermined number of band memories, and prepares the plurality of different schedules by changing the predetermined number of band memories.

In addition, the time prediction means preferably accumulates rendering times in units of objects included in each band to predict the rendering time of each band.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a view showing a fixed table scheme in calculating the rendering time according to the embodiment of the present invention;

FIG. 21B is a view showing expansion processing in the second embodiment of the present invention; and FIG. 22 is a flow chart showing a print overrun countermeasure processing sequence in the second embodiment of the present invention.

DETAILED DESCRIPTION OF THE PREFERRED EMBODIMENTS

[First Embodiment]

Figure 1:
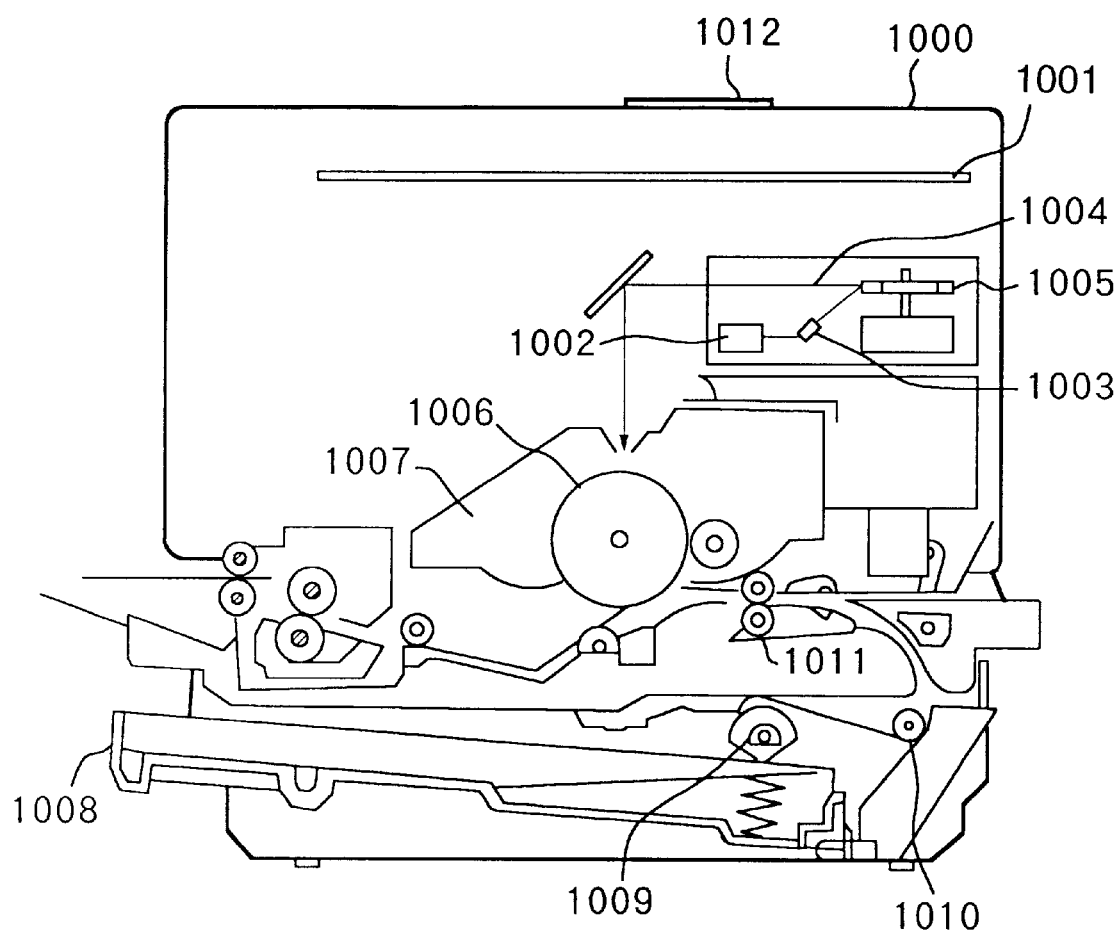
FIG. 1 is a sectional view showing the arrangement of an output apparatus to which the present invention can be applied.

<Description of FIG. 1 (Description of Apparatus)>

The arrangement of a laser beam printer (page printer) suitable as a printing apparatus of this embodiment will be described with reference to FIG. 1.

The printing apparatus of this embodiment is not limited to a laser printer, but maybe a printing apparatus of another printing scheme such as an inkjet printer.

FIG. 1 is a sectional view showing the arrangement of a laser beam printer (LBP) as an example of the printing apparatus to which the present invention can be applied.

Referring to FIG. 1, an LBP main body 1000 receives and stores print data (a printer language such as a page description language composed of a character code and a control code) supplied from a host computer externally connected, form information, a micro instruction, and the like. The LBP main body 1000 prepares bitmap data such as character and form patterns corresponding to these pieces of information and forms an image on printing paper serving as a printing medium. Operation switches, an LED display, and the like are arranged on an operation panel 1012. A printer control unit 1001 controls the entire operation of the LBP main body 1000 and analyzes the print data and the like supplied from the host computer.

The printer control unit 1001 converts mainly character information (character code) into a video signal representing a character pattern corresponding to the character information and outputs the video signal to a laser driver 1002.

The laser driver 1002 is a circuit for driving a semiconductor laser 1003. The laser driver 1002 switches on/off a laser beam 1004 emitted by the semiconductor laser 1003 in accordance with the input video signal.

The laser beam 1004 is deflected by a rotary polygon mirror 1005 in the right-and-left direction to scan and expose an electrostatic drum 1006.

By the above operation, an electrostatic latent image representing a character pattern is formed on the electrostatic drum 1006. This latent image is developed by a developing unit 1007 disposed around the electrostatic drum 1006 and is transferred to printing paper. The rotational speed of the electrostatic drum 1006 is constant.

The printing paper is a cut sheet stored in a paper cassette 1008 attached to the LBP main body 1000. The cut sheet is fed into the apparatus by a paper feed roller 1009, a convey roller 1010, and convey rollers 1011 and supplied to the electrostatic drum 1006.

The LBP main body 1000 has card slots (not shown) to which an optional font card in addition to the built-in fonts, and a control card (emulation card) having another printer language system can be connected.

Figure 2:
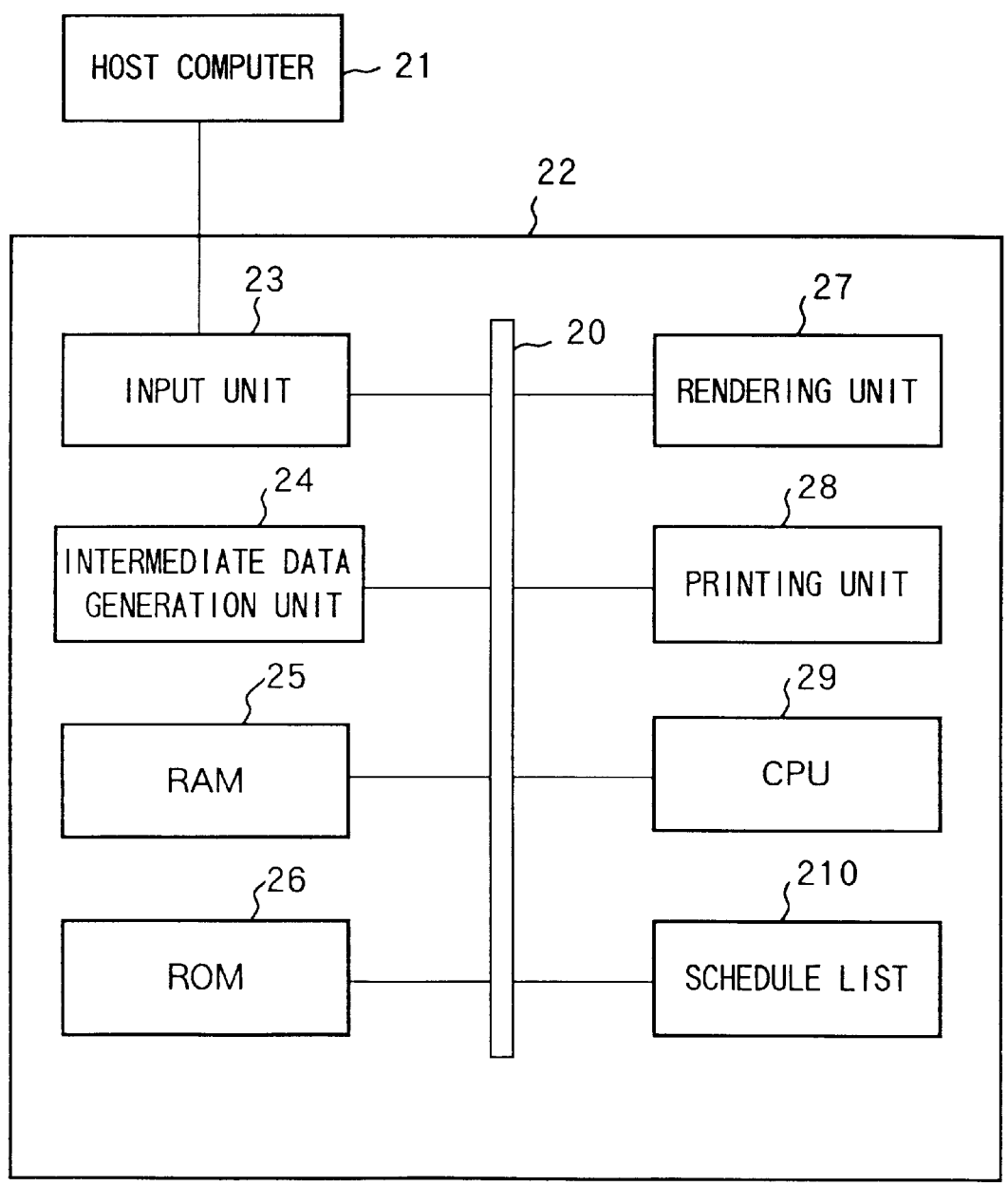
FIG. 2 is a block diagram for explaining the arrangement of a printer control system according to an embodiment of the present invention.

<Description of FIG. 2 (Arrangement Block Diagram)>

FIG. 2 is a block diagram for explaining the arrangement of a control system for the printing apparatus of this embodiment. A laser beam printer (FIG. 1) is taken as an example.

If the functions of the present invention are performed, a single equipment or a system consisting of a plurality of equipments is applicable to the present invention. In addition, a system for performing processing through a network such as a LAN is also applicable to the present invention.

Referring to FIG. 2, a host computer 21 is connected to a printing device 22 via a predetermined interface (e.g., a bidirectional interface) to execute communication processing.

An input unit 23 performs communication processing with the host computer 21. The input unit 23 receives print data from the host computer 21. Information in the printing device 22 may be transmitted to the host computer 21, if needed.

An intermediate data generation unit 24 converts print data into intermediate data in the form easy to process in the printing apparatus.

A RAM 25 is a memory used in the present invention. The RAM 25 holds intermediate data derived from the print data received by the input unit 23, a bitmap obtained by rendering intermediate data, a temporary buffer area necessary for other processing operations, and a variety of processing status data.

A ROM 26 holds processing to be described in the present invention and processing programs executed by the printing device 22.

A rendering unit 27 prepares a print image to be actually printed and output in accordance with the contents of the intermediate data stored in the RAM 25.

A printing unit 28 serves as an output unit for printing and outputting the print image prepared by the rendering unit 27 to, e.g., an actual paper surface.

A CPU 29 actually performs print processing for the printing device 22 of this embodiment of the present invention and data processing (to be described later).

A schedule list 210 holds band memory use schedules to be described with reference to FIG. 15.

An internal bus 20 connects the respective units of the printing apparatus of this embodiment.

Processing of the CPU 29 using the programs stored in the ROM 26 will be described below. The general flow from reception of print data for the printing apparatus of this embodiment of the present invention to print output of the print data, and the mechanism of band processing will be described first, the mechanism of a method of preventing a print overrun will be described next using a timing chart, and actual application examples will then be described using flow charts.

<General Flow of Print Processing of This Embodiment and Mechanism of Band Processing>

The general flow of print processing will be described with reference to flow charts first, and the mechanism of band processing will then be described centered on the use of memories.

Figure 3:
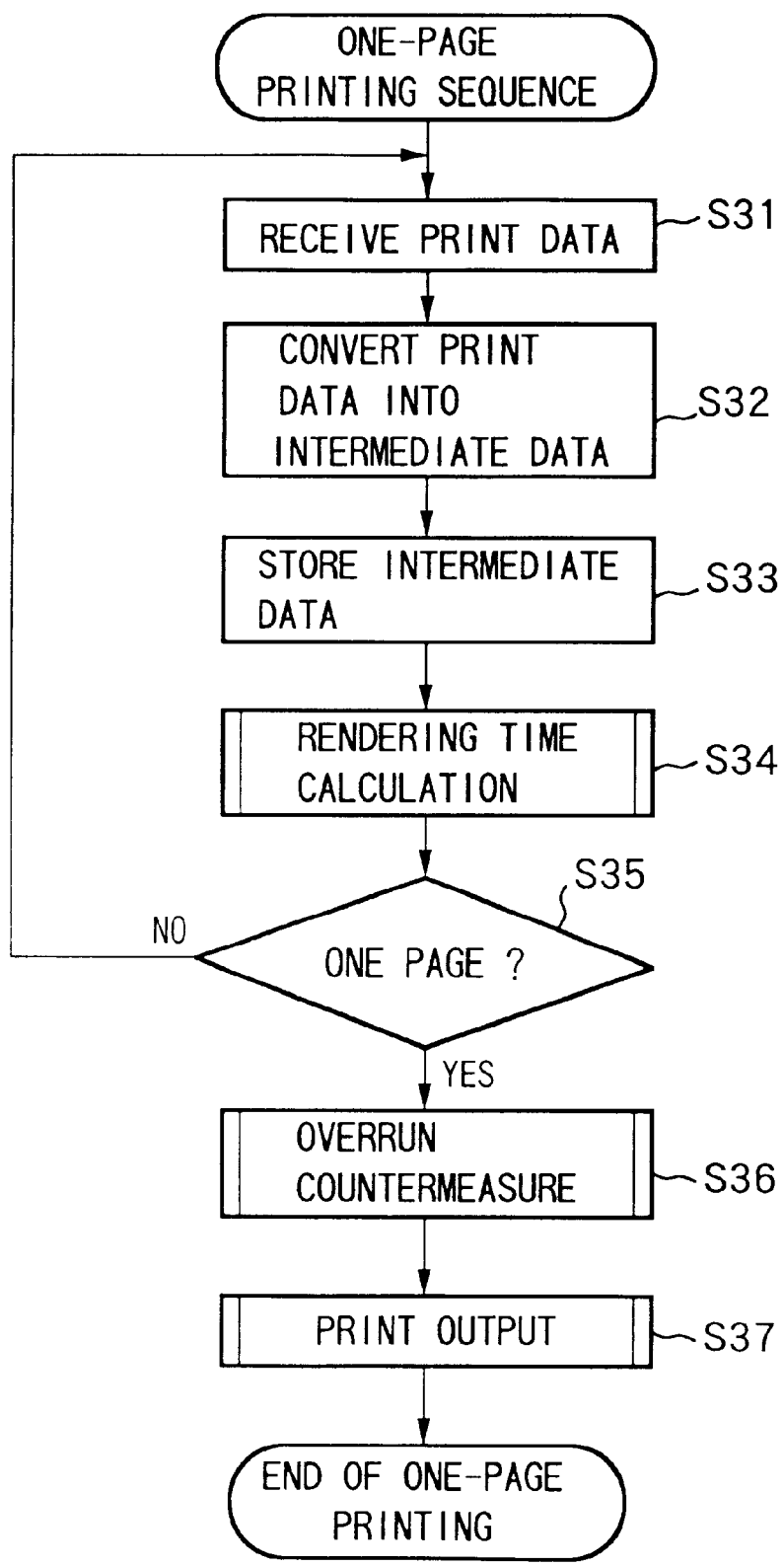
FIG. 3 is a flow chart showing a one-page printing sequence according to the first embodiment of the present invention.

<Description of FIG. 3 (One-Page Printing Sequence)>

FIG. 3 is a flow chart showing the sequence from reception of one-page print data to print output in the printing device 22.

(Data Reception)

In step S31, the input unit 23 receives print data from the host computer 21. This print data is described by the page description language or the like. In step S32, the received print data is supplied to the intermediate data generation unit 24 and converted into intermediate data. In step S33, the intermediate data is stored in the RAM 25. The intermediate data has a format convenient for internal processing such as a format easy to process in the rendering unit 27, a format to reduce its size, or a format to increase its processing speed.

(Calculation of Rendering Time)

In step S34, a calculation is performed for processing for preventing a print overrun. In step S34, a rendering processing time of the intermediate data stored in step S33 is calculated, and the rendering processing times of the bands are accumulated to measure a rendering time in units of bands. The rendering time calculation will be described in detail with reference to FIG. 12.

It is determined in step S35 whether one-page print data is completely processed. If NO in step S35, processing from step S32 is repeated for the next print data.

(Print Overrun Prevention)

When one-page print data is completely rendered, print overrun prevention processing is performed in step S36.

In the print overrun prevention processing, the number of band memories and their use are so determined not to cause a print overrun on the basis of the rendering time for each band calculated in step S34 to prepare the schedule list 210.

The print overrun prevention processing will be described in detail with reference to FIG. 16.

(Print Output)

The print data is finally printed and output on the actual paper in step S37. The band memories are used in accordance with the schedule list prepared in the print overrun prevention processing, and its details will be described with reference to FIG. 18.

Figure 4:
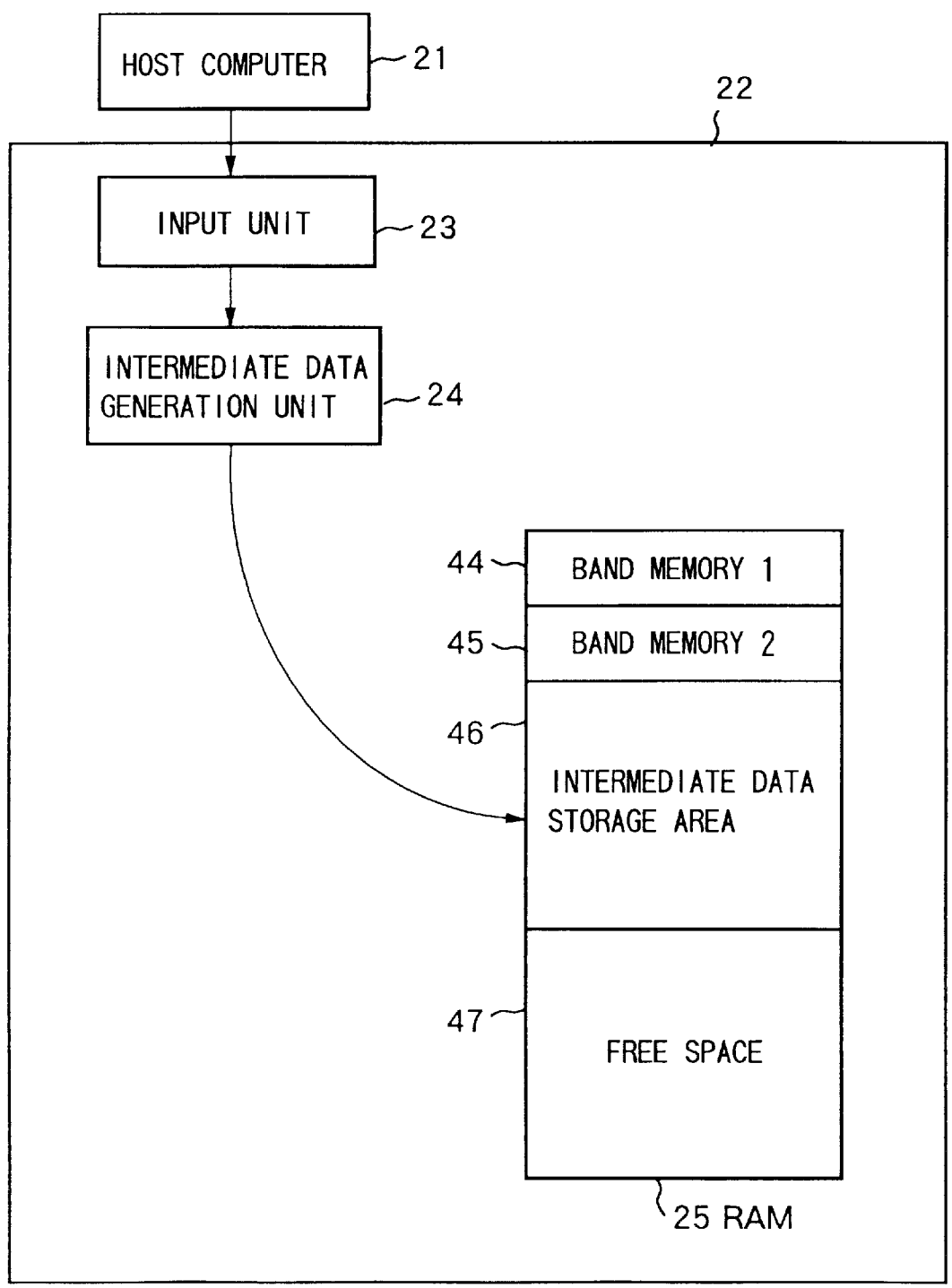
FIG. 4 is a view showing memory processing upon receiving print data according to the embodiment of the present invention.

<Description of FIG. 4 (Data Input Memory Map)>

FIG. 4 is a view for explaining memory processing upon receiving print data in the printing device 22. Reference numerals 44 to 47 denote the areas in the RAM 25 in the printing device 22. When print data is communicated and transferred from the host computer 21 to the input unit 23, the print data is converted into intermediate data by the intermediate data generation unit 24 and stored in the intermediate data storage area 46 in the RAM 25. The structure of the intermediate data will be described in detail with reference to FIG. 5 next.

In addition to the intermediate data storage area 46, the RAM25 also has the band memories 1 (44) and 2 (45). These areas store a to-be-printed output image for each band, which is obtained by rendering the intermediate data in normal print processing. These areas will be described with reference to FIGS. 6A and 6B later.

The remaining area of the RAM 25 is the free space 47. When the printing device 22 does not receive any print data, no intermediate data is present in the intermediate data storage area 46. The area of the printing device 22 except the band memories 1 (44) and 2 (45) serves as the free space 47.

When the free space 47 is still available upon storing one-page intermediate data in the intermediate data storage area 46, the intermediate data of the next page is stored simultaneously with print output processing of the stored page, so that continuous print data can be received to the full capacity.

The management structure of the intermediate data in the intermediate data storage area 46 will be described below.

Figure 5:
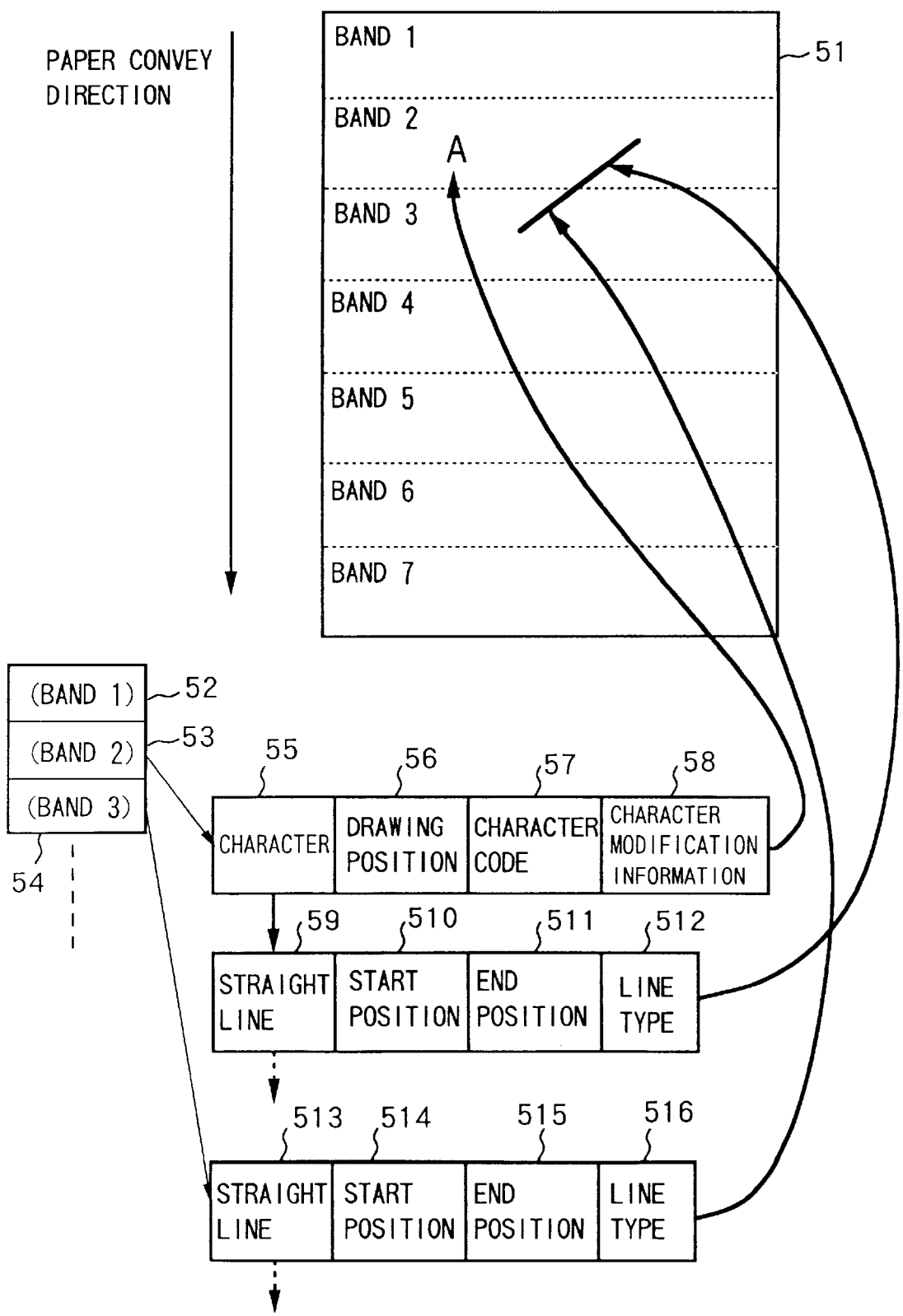
FIG. 5 is a view for explaining the structure and management format of intermediate data according to the embodiment of the present invention.

<Description of FIG. 5 (Intermediate Data Structure)>

FIG. 5 is a view for explaining the structure and management format of the intermediate data by the printing device 22. The printing device of this embodiment based on the present invention divides one output page into several small areas (bands) and simultaneously renders each band and prints and outputs it. For this reason, in this embodiment, since the print data is managed in units of bands, the print data is managed in the format easy to manage, i.e., in the intermediate data format. Simultaneous processing will be described later with reference FIGS. 6A and 6B and the like.

One-page output paper 51 is divided into small areas as bands called band 1, band 2, . . . . The bands are arranged in a direction perpendicular to the paper convey direction, as shown in FIG. 5. Since all the bands are divided to have the same area, times required for electrostatic latent image formation of the respective bands are equal to each other.

As shown in FIG. 5, assume that the printing apparatus receives print data to draw one character "A" and a diagonal line on the output paper 51. The intermediate data of this print data has the following structure.

First of all, the intermediate data is connected to intermediate data-management tables 52 to 54. The intermediate data management tables 52 to 54 are equal in number to the bands. The intermediate data to be drawn is held in a link structure in each band.

Since the character "A" should be written in band 2, its intermediate data 55 to 58 are connected to the intermediate data management table 53 of band 2. The intermediate data structure holds an area representing the type of intermediate data, an area representing a drawing position, information associated with drawing, and the like in accordance with the type of intermediate data. The intermediate data representing the character "A" is composed of the data type 55 representing that the type of intermediate data is character, the drawing position 56 where "A" is drawn, the character code 57 representing that a character to be drawn is "A", and modification information 58 associated with character modification methods of, e.g., a bold character, outline type, and character color.

Since the line is drawn on the output paper 51 across bands 2 and 3, two intermediate data are prepared and corrected to the intermediate data management table 53 of band 2 and the intermediate data management table 54 of band 3, respectively.

The intermediate data managed as described above are rendered in units of bands in print output, and then printed and output. One intermediate data corresponding to band 2 is composed of a data type 59 representing that the data type is a line, a start position 510, an end position 511, and a line type 512 representing the type and thickness of a line such as a solid bold line. The other intermediate data corresponding to band 3 is composed of a data type 513, a start position 514, an end position 515, and a line type 516.

Figure 6A:
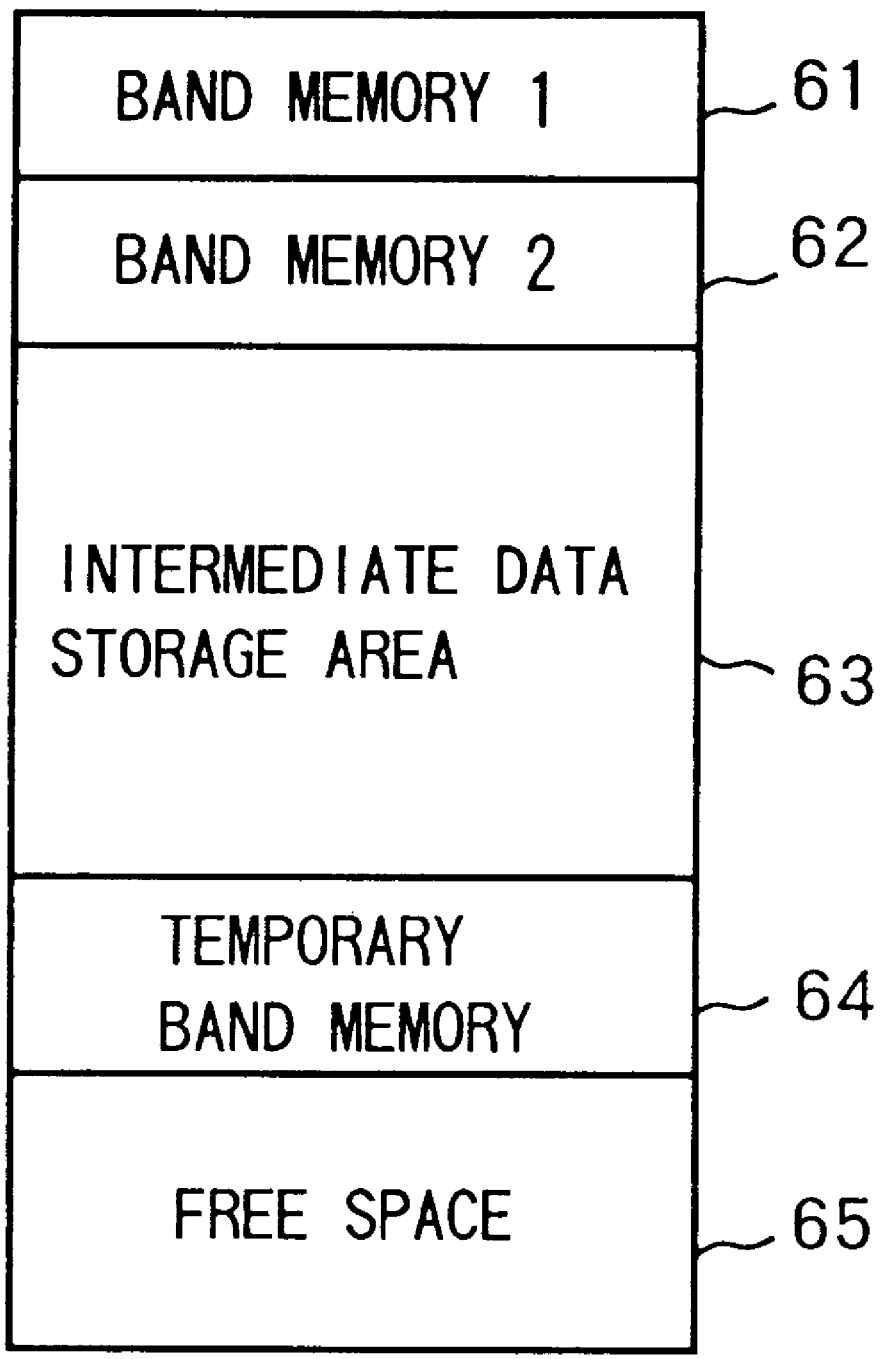
FIG. 6A is a view showing a memory map when print data stored in the intermediate data format is to be printed and output in the embodiment of the present invention.
Figure 6B:
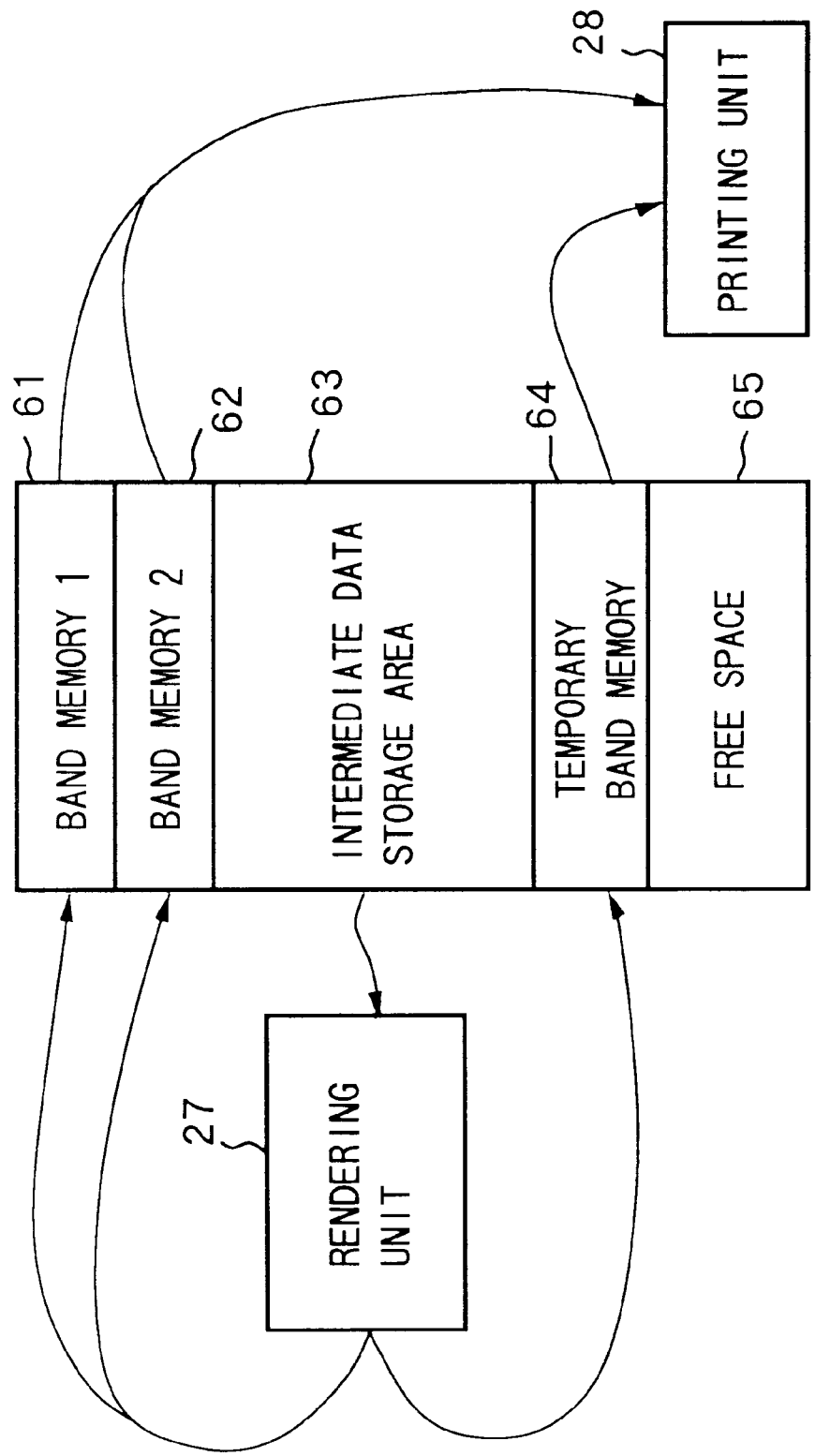
FIG. 6B is a view showing a state in which print data stored in the intermediate data format is rendered and printed in the embodiment of the present invention.

<Description of FIGS. 6A and 6B (Banding Memory)>

FIGS. 6A and 6B are views for explaining processing (banding) associated with bands when print data stored in the intermediate data format is actually printed and output.

FIG. 6A shows a memory map when overrun processing is complete after the intermediate data is stored in the one-page intermediate data storage area.

The band memories 1 and 2 are raster memories for storing a print output image obtained upon rendering the intermediate data. The intermediate data to be rendered is stored in an intermediate data storage area 63 in the data structure described with reference to FIG. 5.

When three or more band memories are required by print overrun processing upon storing one-page intermediate data, a temporary band memory 64 is prepared by using a free area after the intermediate data storage area 63. FIG. 6A shows one temporary band memory.

FIG. 6B shows a data flow when data is printed and output using the two band memories 1 and 2 and the temporary band memory 64.

The intermediate data is rendered by the rendering unit 27, and the resultant output bitmap is stored in three band memories in accordance with a schedule determined by print overrun prevention processing (to be described later). The printing unit 28 prints and outputs the output image on actual paper. This processing will be described later with reference to the flow chart in FIG. 18.

<Print Overrun Prevention Method>

The print overrun prevention method as the main part of the present invention will be generally described below.

Figure 7:
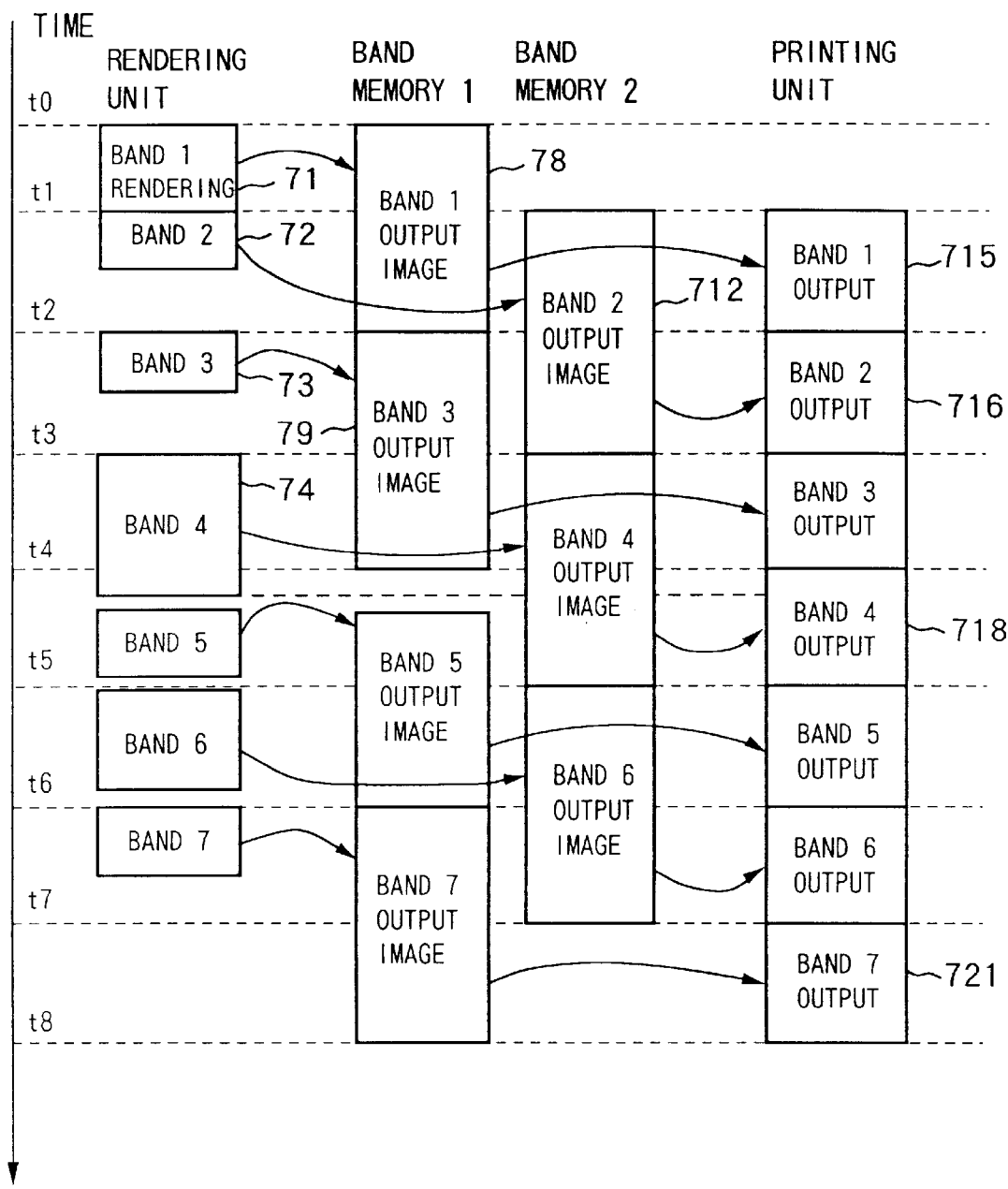
FIG. 7 is a timing chart for explaining the timings of print output processing in the embodiment of the present invention.

<Description of FIG. 7 (Banding Timing)>

FIG. 7 is a timing chart showing the processing contents of the rendering and printing units and changes over time in output image held by the band memories 1 and 2 when the time is plotted along the ordinate. Each time interval between time t0 and time t8 represents a time for outputting image data from one band memory to print an image of a band. When a rendering time is longer than this time interval, an overrun occurs. The overrun has occurred in the fourth band in FIG. 7. A description will be made along the time axis below.

During a time interval between time t0 and time t1, the rendering unit 27 renders (71) band 1 as the uppermost band to be printed and output first on paper and stores (78) the resultant output image in the band memory 1.

At time t1, the electrostatic drum 1006 starts rotating (this will be expressed as the start of print output hereinafter).

From time t1, rendering processing and print output processing are simultaneously performed. Since the respective band areas are equal to each other, and the rotational speed of the electrostatic drum 1006 is constant, the print output times (time intervals between time t2 and time t1, between time t3 and time t2, . . . ) of the respective bands are equal to each other. The print output time is determined by the rotational speed of the electrostatic drum 1006.

During a time interval between time t1 and time t2, processing (715) for causing the printing unit 28 to print and output print data of band 1 already stored in the band memory 1, and processing (712) for storing print image in the band memory 2 upon causing the rendering unit to render (72) the intermediate data of band 2 stored in the intermediate data storage area are simultaneously performed.

Similarly, during a time interval between time t2 and time t3, print data of band 2 is printed and output (716), and print data of band 3 is developed into an output image in the band memory 1 (73 and 79).

The above processing is repeated, and print data of band 7 is printed and output (721) during the last time interval between time t7 and time t8, thereby completing one-page printing.

The above scheme requires a minimum of two band memories. The print output processing can be performed by a smaller memory capacity than that required to store a one-page output image.

When rendering 74 of band 4 is taken into consideration, however, the rendering time of this band is longer than the time interval between time t4 and time t3. The rendering start time of band 4 must be time from time t3, i.e., after the output image of band 2 is printed and output because the rendering result must be stored in the band memory 2. Actual rendering is not complete at the timing t4 as the print output start time of band 4, thus causing a print overrun. That is, the printing unit 28 tends to start printing and outputting the image data of band 4 from time t4, rendering of band 4 is not complete yet at time t4, and normal printing cannot be started.

To prevent the above situation, the print overrun solving method of the present invention will be described below.

Figure 8:
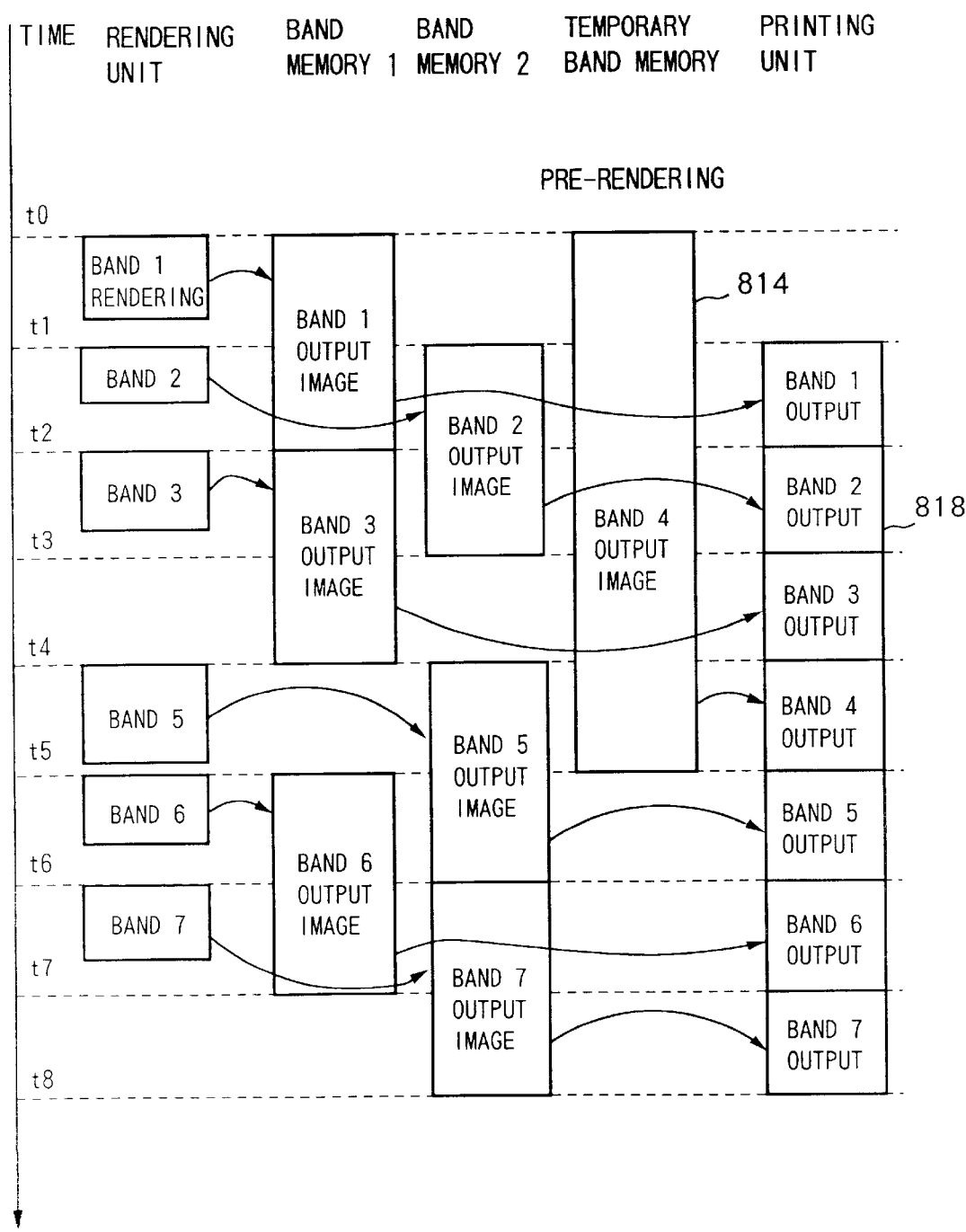
FIG. 8 is a timing chart for explaining rendering in a temporary band memory in processing for preventing a print overrun in the embodiment of the present invention.

<Description of FIG. 8 (Pre-Rendering Timing)>

FIG. 8 is a timing chart for explaining the first method of preventing a print overrun.

As described with reference to FIGS. 6A and 6B, the temporary band memory 64 is assured to render the to-be-print-overrunning data of band 4 before the print output start timing (814). The remaining bands are normally rendered, printed, and output. During print output of band 4, no rendering is performed, and data is printed and output from only the temporary band memory (818).

As described above, the temporary band memory is prepared, and the rendering timings are changed to prevent the print overrun. This method takes advantage of reliably preventing a band from a print overrun regardless of the rendering time of this band.

Figure 9:
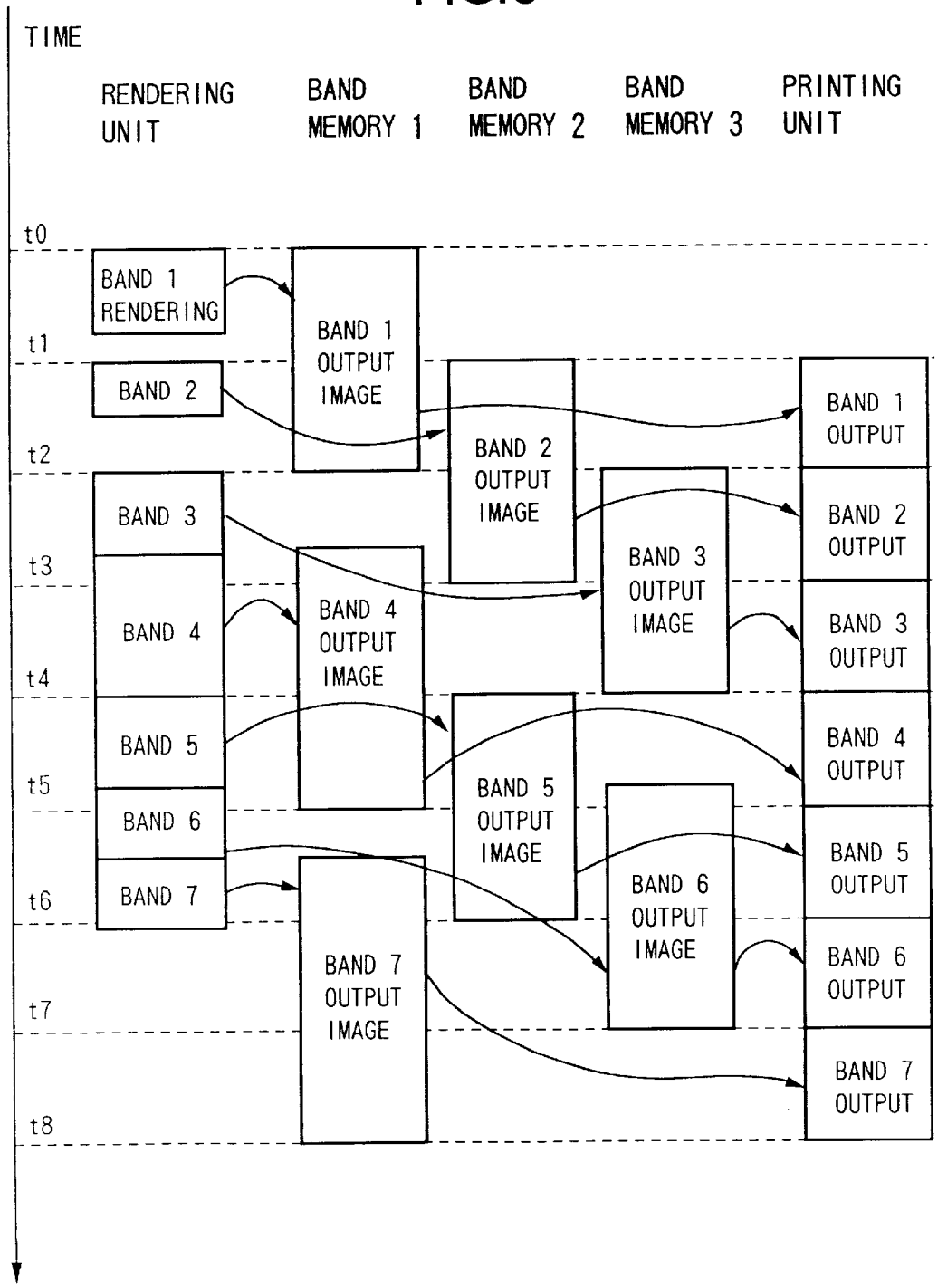
FIG. 9 is a timing chart for explaining rendering and print output timings in using three or more band memories in processing for preventing a print overrun in the embodiment of the present invention.

<Description of FIG. 9 (Banding Timing of 3 or more Bands)>

The second method of preventing a print overrun is shown in FIG. 9.

According to this method, a temporary band memory is assured as in FIG. 8, but a total of three band memories, i.e., the two original band memories and the temporary band memory, are used in order to simultaneously perform rendering and print output.

When three or more band memories are used, the use frequency of each band memory decreases. The larger the number of band memories becomes, the longer the rendering time of each band becomes, thereby preventing a print overrun.

In FIG. 9, the rendering start timing of band 4 having a longer rendering time is immediately after the end of rendering of band 3. As compared with use of two band memories, high-speed processing is allowed. Therefore, rendering can be complete until the print output timing t4 of band 4.

As described above, when the number of band memories used in order increases, the print overrun can be prevented. This method has a characteristic feature of taking a longer rendering enable maximum time as a whole. For example, when three band memories are used, a time required for printing a maximum of two bands can be used for rendering.

Figure 10:
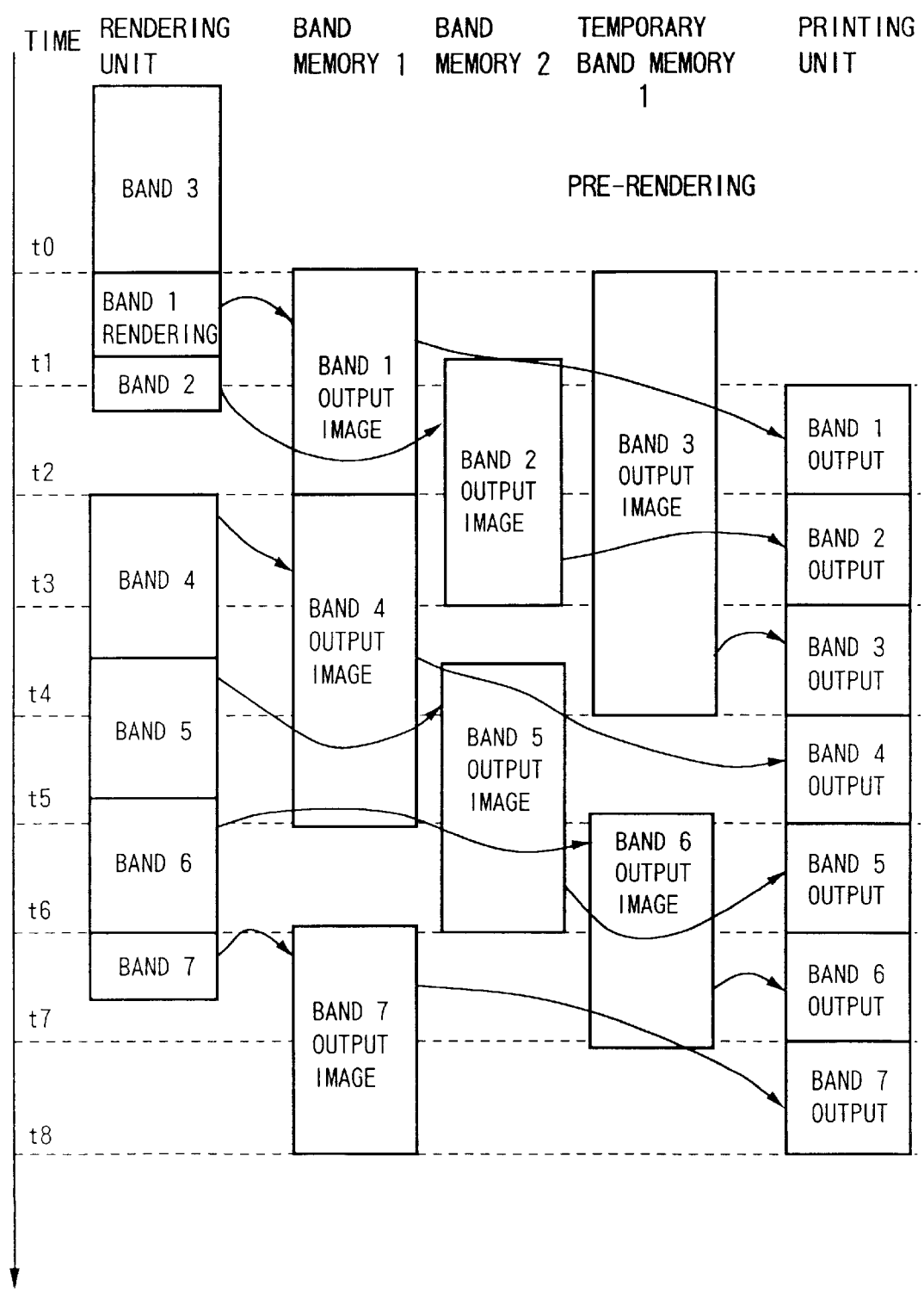
FIG. 10 is a timing chart showing an example in which a print overrun can be prevented at a minimum memory use ratio in the embodiment of the present invention.

<Description of FIG. 10 (Banding Timing of Present Invention)>

FIG. 10 shows the third method as a combination of the two methods described above. According to the third method, rendering timings can be appropriately scheduled, and the number of temporary band memories is minimized to improve memory efficiency.

Even in a case wherein two or more temporary band memories are required in either of the methods in FIGS. 8 and 9, the number of necessary temporary band memories is limited to one, as shown in the timing chart of FIG. 10. In the third method, the rendering time of bands 3, 4, 5, and 6 is longer than the time required for printing and outputting data of one band.

According to this method of the present invention, an output image of band 3 is already rendered in the temporary band memory 64, as shown in FIG. 10. Upon completing print output of band 3, rendering and print output are simultaneously performed using the three band memories, i.e., the band memories 1 and 2 and the temporary band memory.

As described above, the use of the band memories is appropriately scheduled, the print overruns of the four bands can be prevented by assuring only one temporary band memory.

Figure 11:
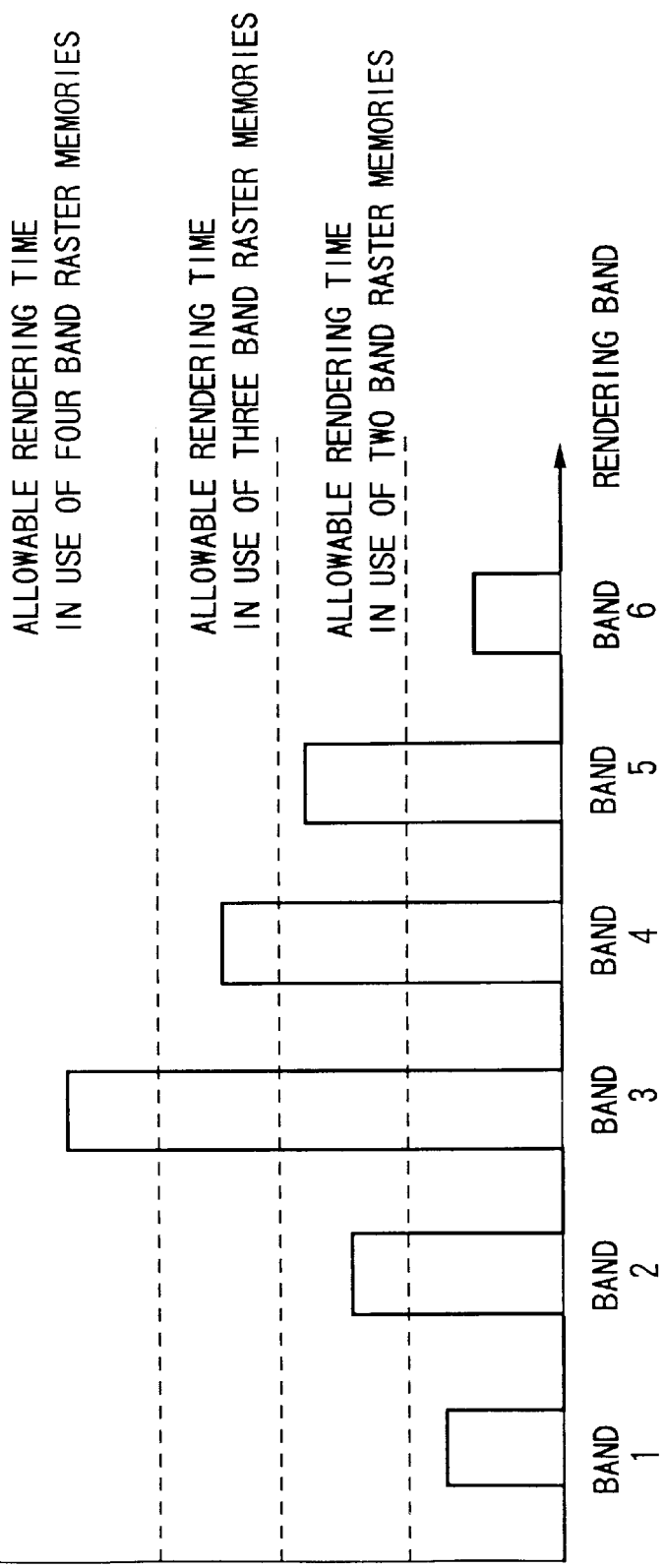
FIG. 11 is a view for explaining the concept of processing in which a print overrun can be prevented at a minimum memory use ratio in the embodiment of the present invention.

<Description of FIG. 11 (Band Memory Use Scheduling)>

An appropriate scheduling in use of band memories described above will be described with reference to FIG. 11. FIG. 11 shows a case using data different from that of FIG. 10. The bands are plotted along the abscissa of FIG. 11, and the rendering times are plotted along its ordinate. Band 3 has the longest rendering time in FIG. 11. The rendering times of bands 4, 5, and 2 sequentially shorten in the order named. Three dotted lines in FIG. 11 represent the longest rendering times spent not to cause an overrun of one band. The lowest dotted line is a case in use of two band memories; the central dotted line, in use of three band memories; and the highest dotted line, in use of four band memories.

When print data having a feature shown in FIG. 11 is printed and output using two band memories, bands 2 to 5 exceed the allowable times, thus causing print overruns. When scheduling as in FIG. 8 is performed such that all the bands subjected to print overruns are rendered in the temporary band memory in advance, temporary band memories equal in number to four bands, i.e., bands 2 to 5 are required.

Two temporary band memories are assured, and the data of the band 3 is rendered in advance. From band 4, the four band memories including the one used for band 3 are used to simultaneously perform rendering and print output. With this arrangement, the rendering time for the bands except band 3 is less than the allowable rendering time using four band memories, and no print overrun occurs.

The gist of the present invention is to prevent a print overrun by using a minimum number of temporary band memories in accordance with optimal rendering scheduling.

<Realization Method of Print Processing Using the above Method>

The print processing flow, the method of using memories, and print overrun prevention method of this embodiment have been described above. A processing sequence of the printing apparatus of this embodiment will be described with reference to flow charts. Since the overall processing flow has already been described with reference to FIG. 3. The rendering time calculation in step S34, the overrun countermeasure in step S36, and the print output processing sequence in step S37, all of which are important points, will be described below.

Figure 12:
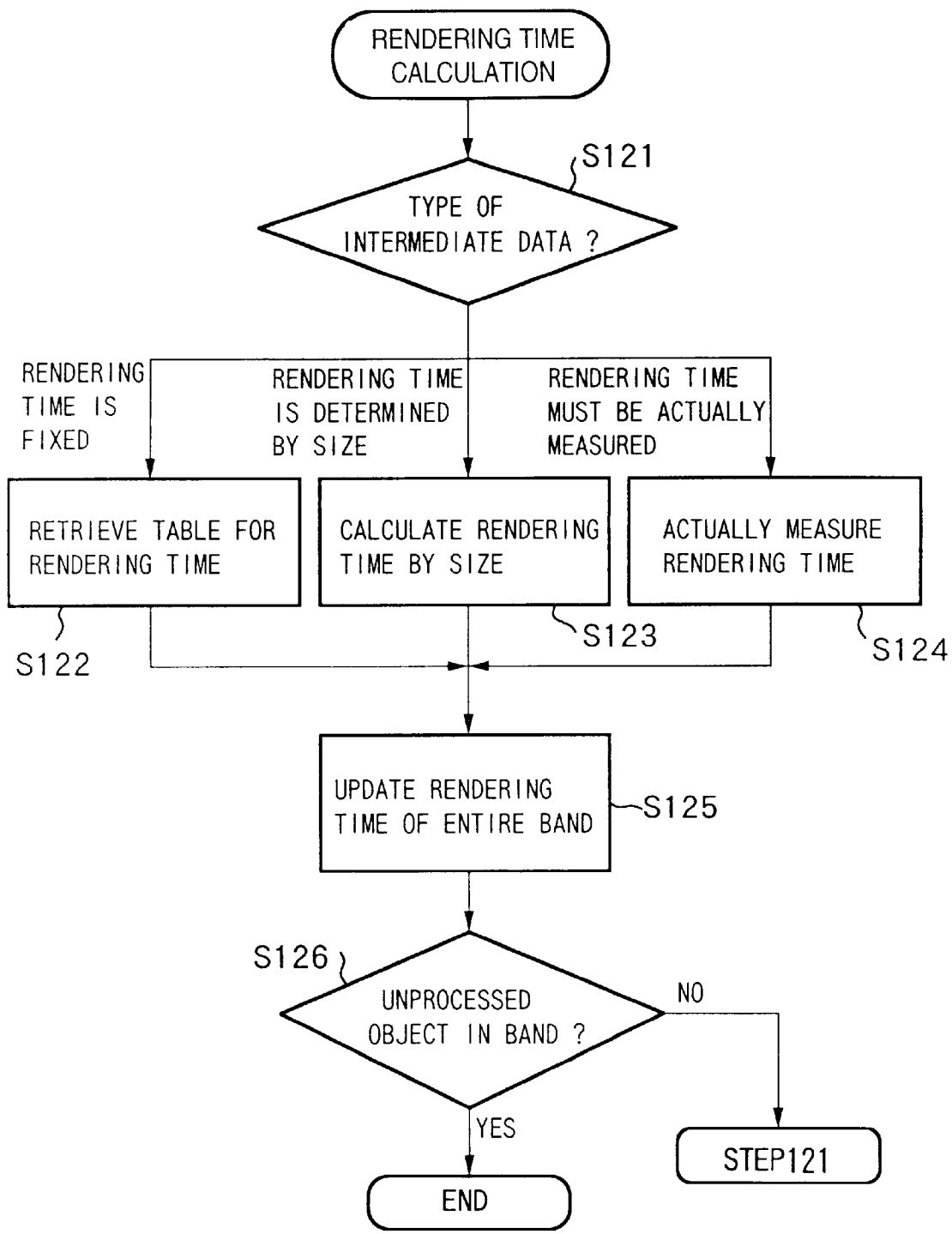
FIG. 12 is a flow chart showing a rendering time calculation processing sequence in the embodiment of the present invention.

<Description of FIG. 12 (Rendering Time Calculation)>

FIG. 12 is a flow chart showing a sequence for calculating a rendering time in units of bands. The rendering time calculated here is used to determine scheduling and the number of temporary band memories assured in overrun countermeasure processing in step S36 of FIG. 3.

In step S121, a rendering time calculation method is selected depending on the type of intermediate data.

If the type of intermediate data is a type for which a fixed rendering time is determined, processing for obtaining a rendering time from the rendering times for the intermediate data already stored in a table is performed in step S122. This type of processing will be described with reference to FIG. 13.

When the type of intermediate data is of the copy of memory contents like an image bitmap, the rendering time to be calculated is determined by the size of the intermediate data. The processing time is calculated using the size in step S123.

When the type of intermediate data represents intermediate data whose rendering time is unknown unless the rendering time is actually calculated, actual rendering processing is performed for time measurement to obtain a rendering time in step S124. This type of processing will be described with reference to FIG. 14.

The above branches and processing operations may be performed using a time calculation algorithm of a type except the ones described here.

Rendering time calculation processing corresponding to the type of intermediate data is performed. In step S125, the calculated time is added to the rendering time of the entire band. If any object whose rendering time is not calculated is present in each band, it is calculated; otherwise, processing is complete.

<Description of FIG. 13 (Rendering Time Calculation by Fixed Table Scheme)>

FIG. 13 is a view for explaining processing for obtaining a fixed rendering time in step S122 of FIG. 12. For intermediate data whose rendering times are known in advance, their rendering times are retrieved from a table representing the correspondence between the types of intermediate data and the corresponding rendering times.

Figure 14:
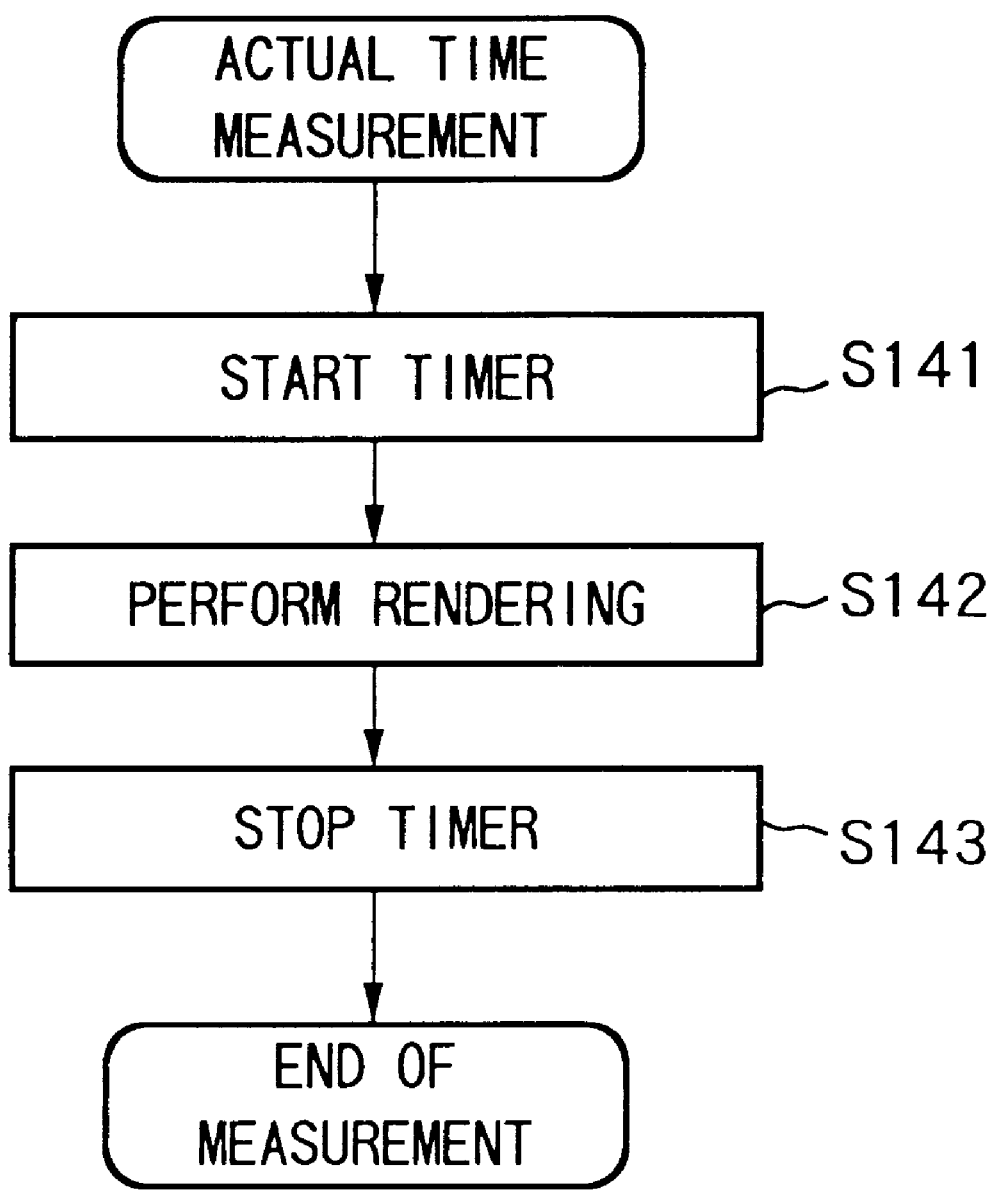
FIG. 14 is a flow chart showing a processing sequence for the actual measurement scheme of calculating the rendering time in the embodiment of the present invention.

<Description of FIG. 14 (Rendering Time Calculation by Actual Measurement Scheme)>

FIG. 14 is a flow chart for explaining actual measurement processing of the rendering time in step S124 of FIG. 12. An internal timer in the printing apparatus is started in step S141, and intermediate data to be measured is rendered as in actual rendering in step S142. Upon completing rendering, the timer is stopped in step S143, and the spent time is defined as the rendering time.

Figure 15:
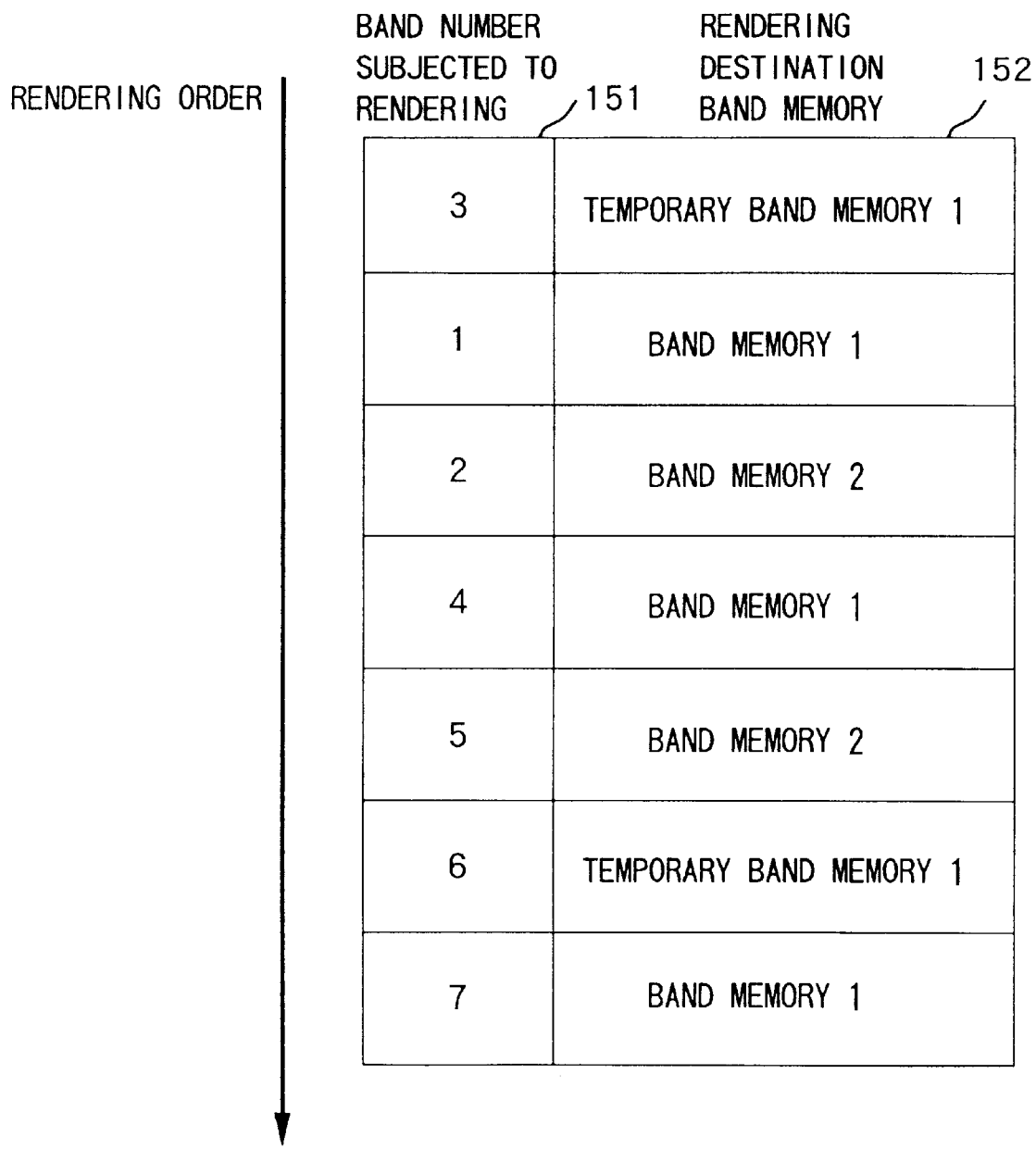
FIG. 15 is a view showing the structure of a schedule list which stores a rendering and band memory use schedule in the embodiment of the present invention.

<Description of FIG. 15 (Schedule List)>

The rendering time of each band is calculated as described above, and one-page print data is stored in the memory, as shown in FIG. 3. The schedule list 210 for schedules for using band memories so as to prevent a print overrun is prepared in step S36 of FIG. 3.

The structure of the schedule list is shown in FIG. 15. Band numbers subjected to rendering are registered in a band column 151, and band memories which are paired with the band numbers and store output images obtained as result of rendering are registered in a band memory column 152. The band numbers and the band memories are arranged in a list structure in the rendering execution order. Each pair of band number and band memory is called a schedule item.

In FIG. 15, first of all, band 3 is rendered in temporary band memory 1, and bands 1, 2, 4 . . . are rendered in band memories 1, 2, 1 . . . in order. The schedule shown in FIG. 15 corresponds to the schedule list in the timing chart of FIG. 10. A method of determining this schedule will be described with reference to FIG. 16 next. Print processing according to the schedule will be described with reference to FIG. 18.

Figure 16:
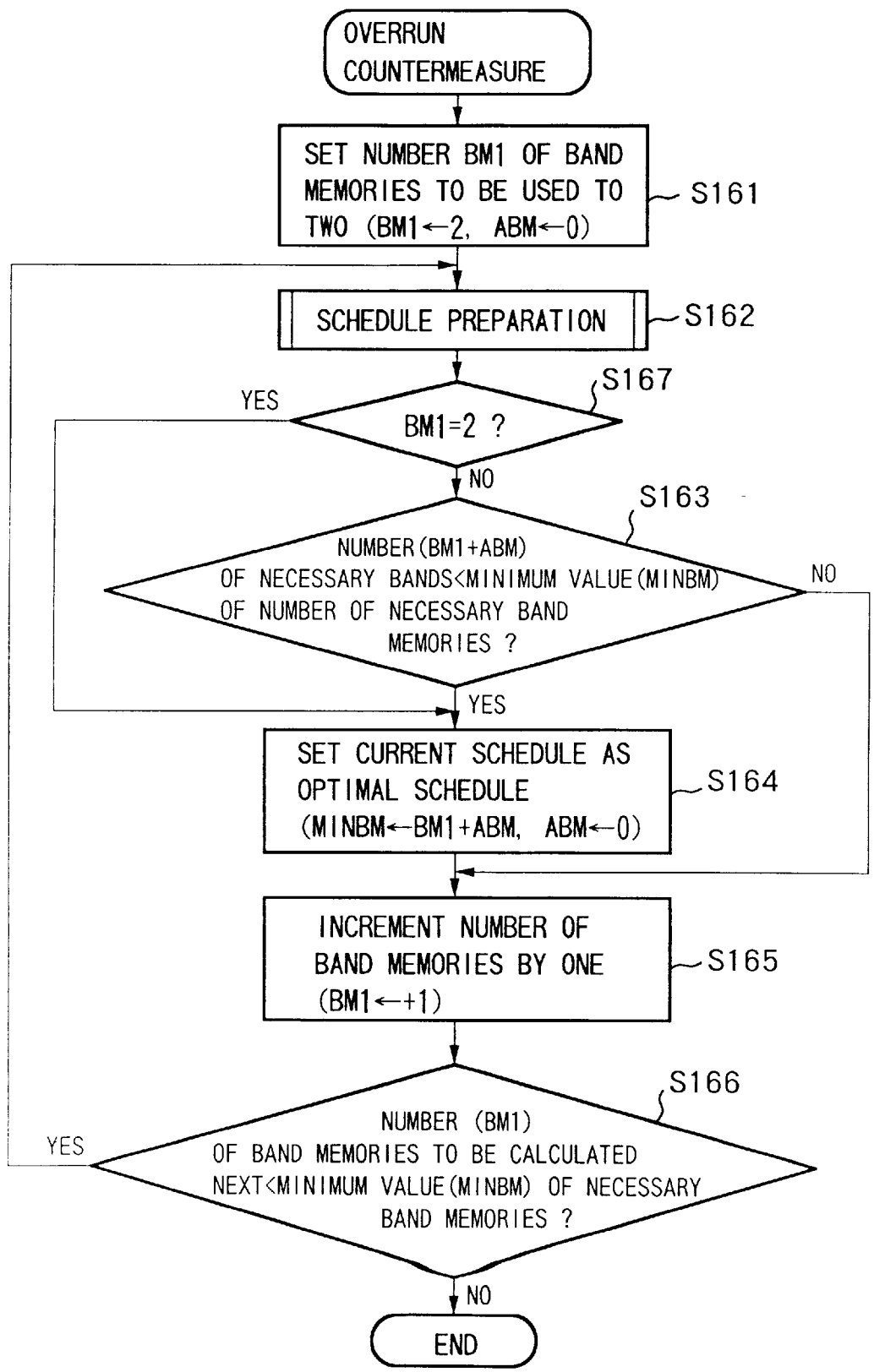
FIG. 16 is a flow chart showing a print overrun countermeasure processing sequence in the embodiment of the present invention.

<Description of FIG. 16 (Overrun Countermeasure)>

FIG. 16 is a flow chart for explaining a method of preparing a schedule list so as not to cause an overrun.

In step S161, use of two band memories to simultaneously perform rendering and print output is checked. In this case, a minimum number BM1 of band memories necessary for the scheduled rendering sequence is initially set to 2, and a number ABM of additional band memories is initialized to 0.

In step S162, an actual schedule is prepared, and at the same time, the number ABM of additional band memories necessary for pre-rendering is obtained. The details of this processing will be described with reference to FIG. 17 next.

It is determined in step S167 whether the schedule is the first prepared schedule. That is, whether BM1=2 is determined. If NO in step S167, the flow advances to step S163; otherwise, the flow advances to step S164.

It is determined in step S163 whether the number (BM1+ABM) of band memories obtained in step S162 is a minimum number of all the checked schedules. That is, the number of band memories is compared with a minimum number MINBM of band memories. If YES in step S163, the latest schedule is defined as the current optimal schedule in place of the previous schedule. The number (BM1+ABM) of necessary band memories in the optimal schedule is set as the minimum number MINBM of band memories. Otherwise, the latest schedule is neglected.

The number of band memories to be simultaneously used is set to a value larger than the number of latest band memories (initially two memories) by one (BM1←BM1+1). It is determined in step S166 whether-the number BM1 is smaller than the number of band memories necessary for the current optimal schedule, i.e., smaller than the current minimum number MINBM of band memories. If YES in step S166, a further check is repeated in step S162 because a smaller number of band memories can be used.

If the number of band memories to be checked is equal to or larger than the minimum number of raster bands, there is no possibility to reduce the number of necessary band memories. The minimum number of band memories free from the print overrun is supposed to be confirmed, and the current optimal schedule is determined as the final schedule.

As described above, a schedule requiring the minimum number of bands is finally determined.

Figure 17:
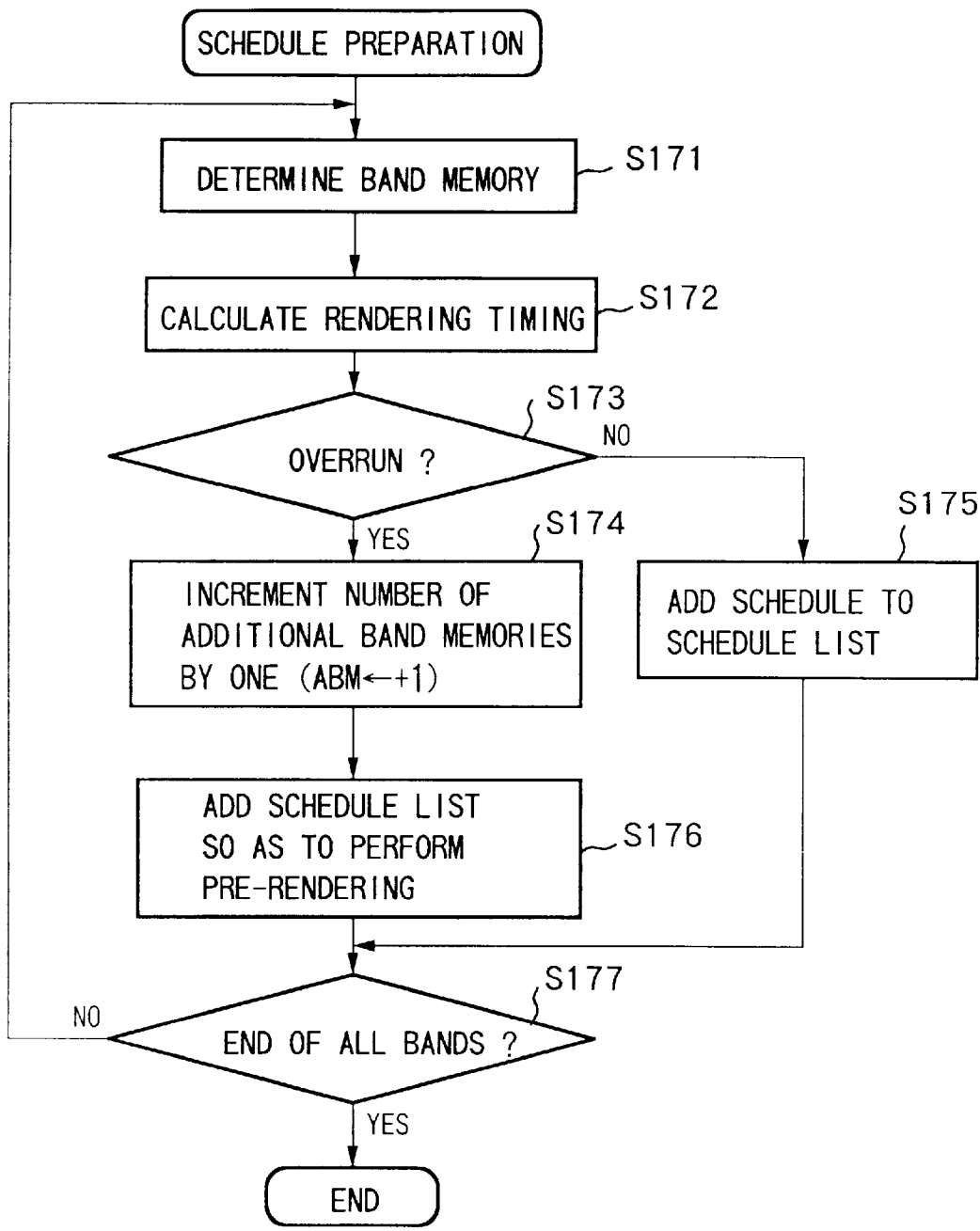
FIG. 17 is a flow chart showing a schedule list preparation processing sequence and a processing sequence for obtaining the number of necessary band memories in the embodiment of the present invention.

<Description of FIG. 17 (Schedule Preparation)>

A method of preparing a schedule in step S162 of FIG. 16 and calculating the number of necessary band memories will be described with reference to FIG. 17.

A schedule for simultaneously performing rendering and print output is prepared using the rendering time of each band obtained by the method described with reference to FIG. 12 and the number of bands designated sequentially from the first band.

Processing is repeated from steps S171 to S177 for each of the band of the page.

As for rendering of each band, a destination band memory which stores an output image obtained by rendering in step S171 is determined. The band memories sequentially prepared in the designated number are used in the order described with reference to FIG. 7.

The rendering start and end timings are calculated in step S172 as follows.

Start of rendering=timing at which previous rendering is complete and rendering destination band memory becomes unused.

End of rendering=rendering start timing+rendering timing of this band.

The band memory use/unused timings are calculated as follows.

Start of use of band memory=timing at which rendering is started for this band memory.

End of use of band memory=timing at which output image stored in this band memory is completely printed and output.

The band memory is being used from the start of use of the band memory to the end of its use. The band memory is unused from the end to start of its use.

The designated band print output start/end timing can be easily determined by the band print order and the paper convey speed because a time required for printing one band (i.e., a one-band paper convey time) is fixed value.

A print overrun is checked in step S173 on the basis of the obtained rendering start timing. More specifically, as shown in FIG. 10, when the rendering end timing delays from the print output start timing upon performing band rendering and print output using the given number of band memories, an overrun occurs in this band.

If no overrun is determined in step S173, the band number subjected to rendering in step S175 and the band memory number of the rendering output destination are added to the end of the schedule list.

When an overrun is detected in step S173, the number ABM of additional necessary band memories is incremented by one in step S174. In step S176, the band number and the band memory number are registered to the top of the schedule list so as to render (pre-render) a band determined to overrun in step S173 in the additional band memory before the printing unit is started.

The band memory once added can be used to simultaneously perform rendering and print output as in the normal band memory after the print image stored in the added band memory is printed and output. This increases the subsequent allowable rendering time and reduces the occurrence frequency of print overruns.

In step S177, it is determined whether or not the preparation of the schedule is complete. If NO in step S177, the process is repeated for the next band from step S171.

The above processing is performed to calculate the timings of all the bands in order from the top band of the page, thereby determining a schedule free from an print overrun.

Figure 18:
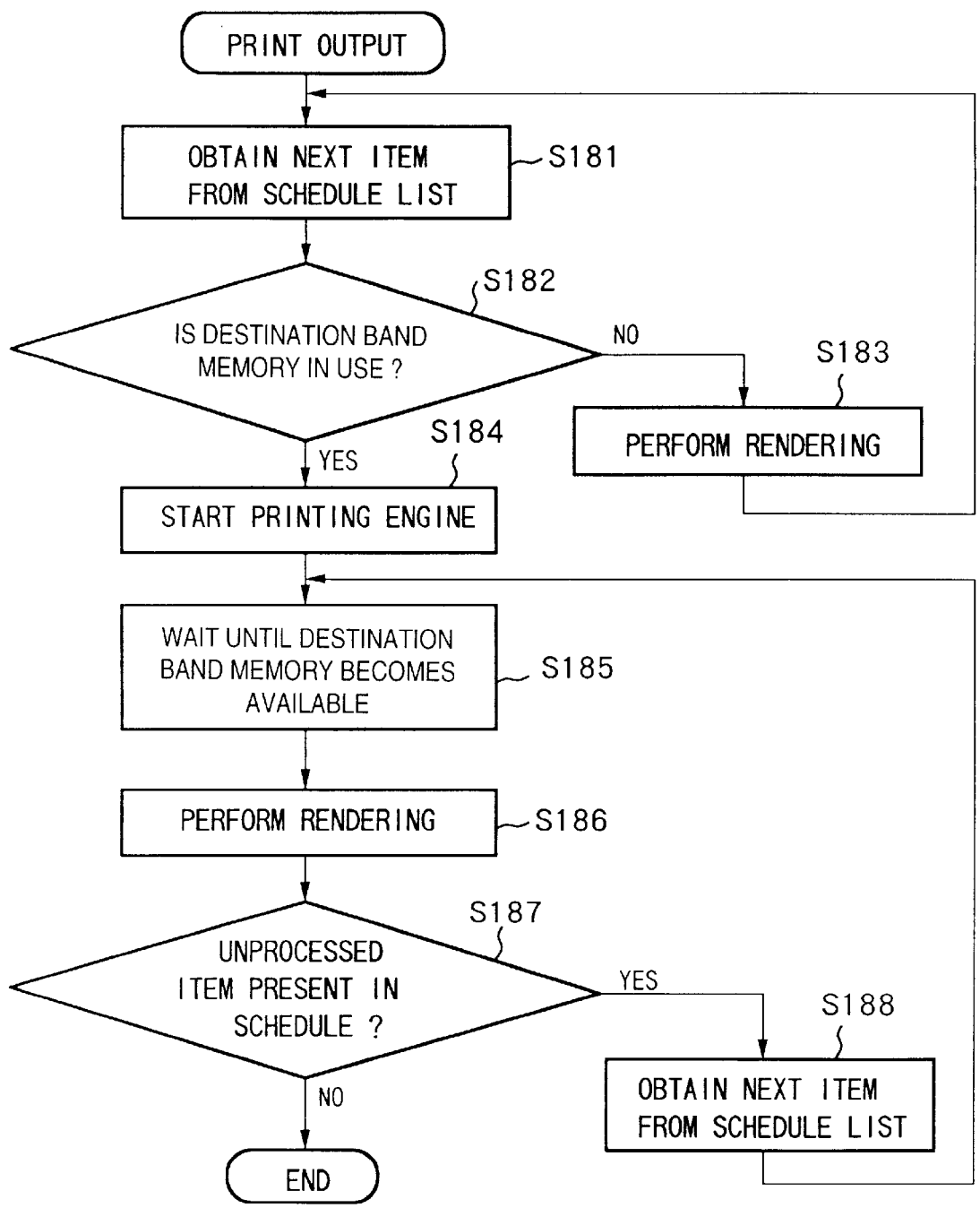
FIG. 18 is a flow chart showing a print output sequence in the embodiment of the present invention.

<Description of FIG. 18 (Print Output Processing)>

Actual print processing using the schedule list prepared as described above will be described with reference to FIG. 18. FIG. 18 shows print output processing shown in step S37 of FIG. 3.

The first schedule of the schedule list is obtained in step S181.

In step S182, the state of a rendering destination band memory described in the schedule is checked. If this band memory is unused, i.e., may be used for rendering, the intermediate data of the band described in the schedule is rendered (step S183). Since no band memories are used at first, rendering can necessarily be made.

The flow returns to step S181 to obtain the next item (band number and band memory number) from the schedule list. When the band memory is not used, rendering is performed, and the flow returns to step S181. This operation is repeated to complete all rendering processing to be executed prior to the start of the printing engine. The bands to be pre-rendered and scheduled are located near the top of the schedule list and rendered prior to printing. Note that pre-rendering is rendering performed prior to printing.

If there are no bands to be pre-rendered, the flow advances to step S184 to start the printing engine. In this case, the printing unit sequentially reads out the data from the band memories and prints the data in the order determined by the schedule. That is, the printing order of the bands is an ascending order from band 1. The band memory which stores the image data of the band to be printed is confirmed from the schedule list, and the image data is output from this band memory. The schedule is transferred to the controller of the printing unit 28, and the controller reads out the data from the band memory in the order determined by the schedule and prints them. Alternatively, the read order of the band memories may be transferred to the controller, and the controller may output the contents of the band memories in the transferred read order.

When printing is started, rendering results are printed and output on actual paper in order from band 1. When the output is complete, the band memory which has stored the band already output becomes unused.

In step S185, control waits until the band memory which should store the rendering result next in accordance with the schedule becomes unused. When the band memory becomes unused, rendering is performed in step S186. The end of this rendering processing is assured until the timing at which the rendering result of this band starts printing. No print overrun occurs.

This is repeated for all the items in the schedule list (step S187) to complete one-page print output processing. The flow advance to step S188 to obtain a schedule for the next page, and printing is performed in the same manner as described above. When all the schedules in the schedule list are completely processed, printing is complete.

<Summary of First Embodiment>

As described above, in the printing apparatus of this embodiment, while the print overrun can be prevented, the number of band memories required for rendering is minimized to improve memory utilization efficiency.

Since rendering times are actually measured, as needed, the print overrun can be reliably prevented.

Pre-rendering is performed, and an additional band memory is used. This additional band memory can be used to simultaneously perform rendering and print output after the pre-rendered band is output from the additional band memory. The necessary memory capacity can be suppressed minimum.

[Second Embodiment]

The second embodiment of the present invention will now be described.

According to this embodiment, a band having a long rendering time is rendered in advance and compressed. In print output, the compressed data is expanded to prevent a print overrun. That is, the expansion time of the compressed data must be predicted.

Figure 19:
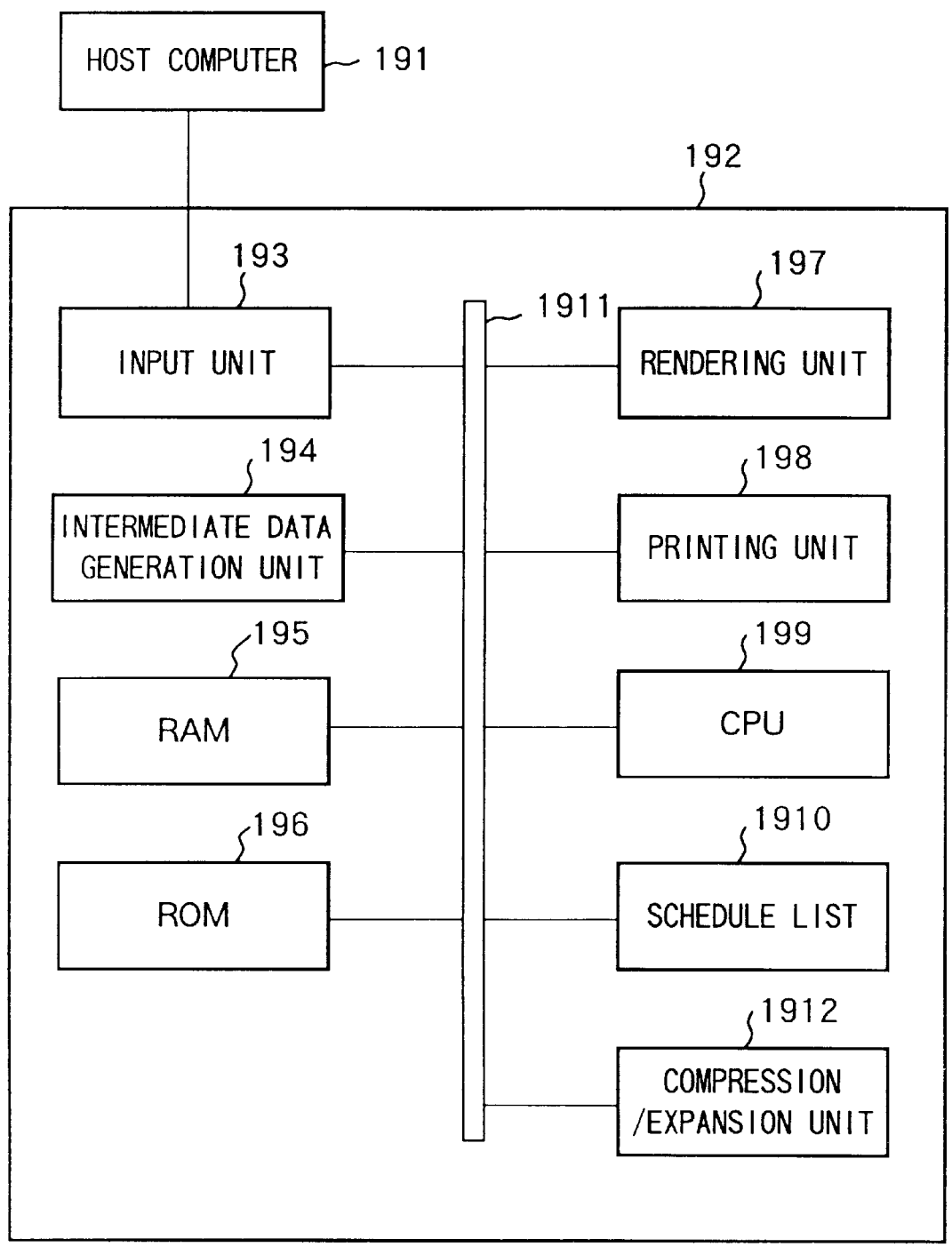
FIG. 19 is a block diagram for explaining the structure of a printer control system according to the second embodiment of the present invention.

FIG. 19 is a block diagram showing the arrangement of a printing apparatus according to the second embodiment. Reference numerals 191 to 1910 and 1911 in FIG. 19 are identical to the blocks 21 to 210 and 20 in FIG. 2 of the first embodiment.

A compression/expansion unit 1912 compresses and expands output image data in accordance with a known coding scheme.

In the second embodiment, an overall print process sequence will be described first, and processing for preventing a print overrun in the printing apparatus of this embodiment will be described with reference to flow charts.

<Compression/Expansion Form>

Figure 20:
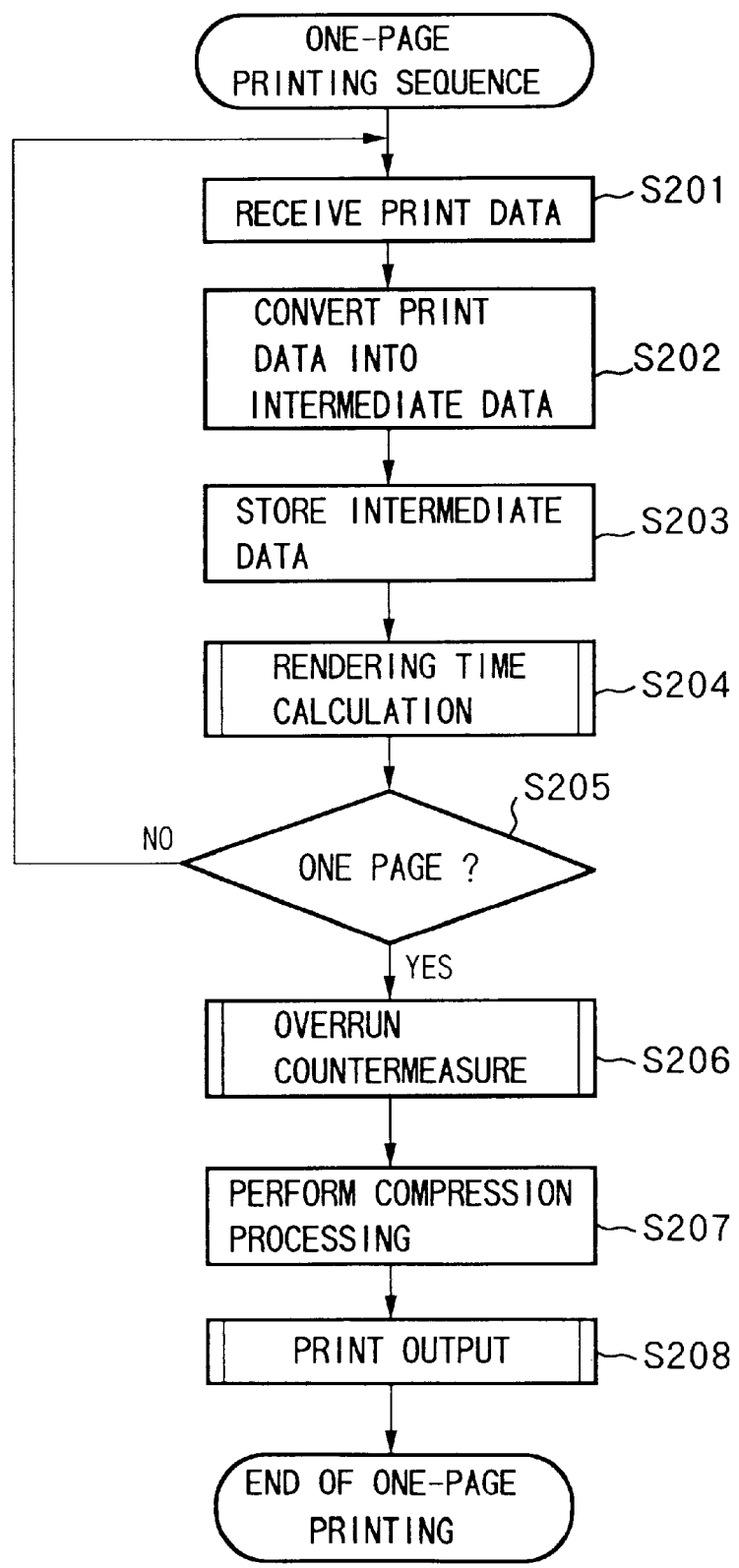
FIG. 20 is a flow chart showing a one-page printing sequence in the second embodiment of the present invention.

FIG. 20 is a flow chart showing a one-page printing sequence according to this embodiment. Steps S201 to S206 are identical to steps S31 to S36 of FIG. 3 of the first embodiment, and a detailed description thereof will be omitted. After step S206, a designated band is rendered and compressed in step S207. In step S208, the compressed band is expanded and developed in a scheduled band memory. The uncompressed band is rendered in a band memory and printed. This processing will be described in detail with reference to FIG. 21. Step S204 is performed similarly to the sequence of FIG. 12. Step S208 is performed similarly to the sequence of FIG. 18. Note that the compressed band is expanded in place of rendering in step S186.

Figure 21A:
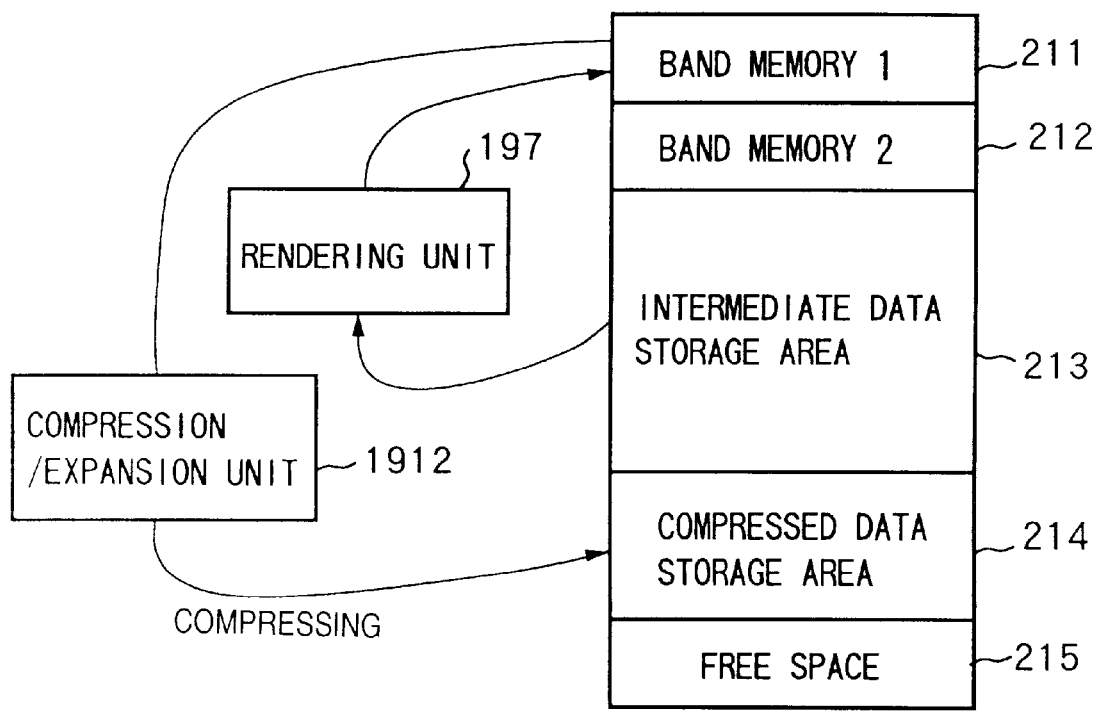
FIG. 21A is a view showing compression processing in the second embodiment of the present invention.

FIG. 21A is a memory map which explains compression processing performed in step S207 of FIG. 20. FIG. 21B is a view for explaining operation for expanding the band in print output.

In compression processing, the rendering unit 197 renders the intermediate data 213 of the designated band in the band memory 211 in accordance with a schedule prepared in step S206. The output image is compressed using the compression function of the compression/expansion unit 1912, and the compressed image is stored in the compressed data storage area 214.

In print output, the data 214 compressed in accordance with the schedule is expanded in the band memory using the expansion function of the compression/expansion unit 1912 and printed and output on the paper surface by the printing unit 198, as shown in FIG. 21B. Uncompressed data is rendered, printed, and output.

<Print Overrun Prevention>

Print overrun prevention processing using the above compression/expansion operation will be described below.

FIG. 22 is a flow chart for explaining processing for determining which band is compressed for overrun prevention processing of this embodiment in step S206 of FIG. 20.

In step S221, assume that no compressed bands are present. A case in which bands having longer rendering times are compressed one by one is checked in steps S222 to S226. In step S221, a size SCD of compressed data is set to 0.

In step S222, a schedule list is prepared by the sequence described with reference to FIG. 17 of the first embodiment. At the same time, the number (BM1+ABM) of necessary band memories is calculated to be minimum. Note that the value of BM1 is fixed to 2 in this embodiment. Unlike in the first embodiment, the timing of a band to be compressed is calculated not by its rendering time but the expansion time of the compressed data.

In step S223, a necessary memory amount SNM is calculated using the number (BM1+ABM) of necessary and memories calculated and the compressed data size sum SCD of the band designated to be compressed. It is determined in step S228 whether the number of compressed bands is 0, i.e., whether the first schedule is prepared. If the number of compressed bands is determined to be 0, the flow advances to step S225; otherwise, the flow advances to step S224.

When it is determined in step S224 that the necessary memory amount SNM is smaller than a minimum value MINSNM of the necessary memory amount calculated so far, the latest schedule is defined as a schedule having the highest use frequency at present. The value of the latest necessary memory amount SNM is set as the minimum value MINSM of the necessary memory.

Assume that a band having a long rendering time is compressed in step S226. Under this assumption, a check is repeated from step S222. This check is repeated until all the bands are compressed in step S227.

By the above sequence, a schedule for minimizing the size of the necessary band memory and the sum of the sizes of necessary compressed data memories can be prepared.

<Summary of Second Embodiment>

As described above, since data having long rendering times are rendered in advance by the number of bands with which the necessary memories can be minimized. The memory utilization efficiency can be improved, and the print overrun can be prevented. Since a band is compressed and stored, the print overrun can be reliably prevented by a smaller memory capacity than the one-page memory capacity even if a larger memory capacity is required. Rendering is performed simultaneously with printing. Assume that the rendering time exceeds a one-band convey time. In this case, when the overrun can be prevented by using three or more band memories, no compression is performed, thereby minimizing the necessary compressed data memory capacity. Under the above assumption, when the overrun can be prevented without using any additional band memory by rendering the band in advance and compressing it, no additional band memory is used, thereby minimizing the memory capacity.

[Other Embodiments]

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, a printing apparatus and image processing method according to the present invention can minimize a memory capacity used to prevent a print overrun.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for rendering band image data to a band memory and outputting the band image data from the band memory simultaneously, characterized by comprising:

time prediction means for obtaining a necessary rendering time of each band;

schedule means for preparing a rendering schedule having a minimum memory capacity on the basis of the necessary rendering time and a necessary printing time of the rendered band image data;

rendering means for rendering each band in accordance with the schedule; and output means for outputting contents of each band memory in accordance with the schedule.

2. The apparatus according to claim 1, characterized in that said schedule means prepares a plurality of different schedules, determines as the schedule having the minimum memory capacity a schedule having a minimum number of band memories of the plurality of different schedules, adds a new band memory for rendering, in advance, a given band whose rendering end time does not match output start time when rendering and output of image data of the given band are simultaneously performed using a predetermined number of band memories, and prepares the plurality of different schedules by changing the predetermined number of band memories.

3. The apparatus according to claim 1, characterized in that the schedule means prepares a plurality of different schedules, determines a schedule having a minimum memory capacity of the plurality of different schedules, adds a new memory for rendering, compressing, and storing, in advance, a given band whose rendering end time does not match output start time when rendering and output of image data of the given band are simultaneously performed using a predetermined number of band memories, and prepares the plurality of different schedules by changing the predetermined number of band memories.

4. The apparatus according to any one of claims 1 to 3, characterized in that said time prediction means accumulates rendering times for each type of object contained in each band to predict a rendering time of each band.

5. An image processing method characterized by comprising the steps of:

obtaining a necessary rendering time of each band;

preparing a rendering schedule requiring a minimum memory amount to be used, on the basis of the necessary rendering time and a necessary printing time of rendered band image data; and performing rendering of each band on the basis of the schedule.

6. The method according to claim 5, characterized in that the schedule is selected as a schedule having a minimum number of band memories of the plurality of different schedules, each of the plurality of schedules is prepared by adding a new band memory for rendering, in advance, a given band whose rendering end time does not match output start time when rendering and output of image data of the given band are simultaneously performed using a predetermined number of band memories, and the plurality of different schedules are prepared by changing the predetermined number of band memories.

7. The method according to claim 5, characterized in that the schedule is selected as a schedule having a minimum memory capacity of the plurality of different schedules, each of the plurality of different schedules is prepared by adding a new memory for rendering, compressing, and storing a given band whose rendering end time does not match output start time when rendering and output of image data of the given band are simultaneously performed using a predetermined number of band memories, and the plurality of different schedules are prepared by changing the predetermined number of band memories.

8. The method according to any one of claims 5 to 7, characterized in that the necessary rendering time is predicted by accumulating rendering times calculated for each type of object contained in each band.

9. A computer-readable storage medium storing a program for causing a computer to obtain a necessary rendering time of each band;

prepare a rendering schedule requiring a minimum memory amount to be used, on the basis of the necessary rendering time and a necessary printing time of rendered band image data; and perform rendering of each band on the basis of the schedule.

10. The medium according to claim 9, characterized in that the schedule is selected as a schedule having a minimum number of band memories of the plurality of different schedules, each of the plurality of schedules is prepared by adding a new band memory for rendering, in advance, a given band whose rendering end time does not match output start time when rendering and output of image data of the given band are simultaneously performed using a predetermined number of band memories, and the plurality of different schedules are prepared by changing the predetermined number of band memories.

11. The medium according to claim 9, characterized in that the schedule is selected as a schedule having a minimum memory capacity of the plurality of different schedules, each of the plurality of different schedules is prepared by adding a new memory for rendering, compressing, and storing a given band whose rendering end time does not match output start time compressed band when rendering and output of image data of the given band are simultaneously performed using a predetermined number of band memories, and the plurality of different schedules are prepared by changing the predetermined number of band memories.

12. The medium according to claim 9, characterized in that the necessary rendering time is predicted by accumulating rendering times calculated for each type of object contained in each band.

* * * * *